(12) United States Patent
Eglen et al.

(10) Patent No.: US 7,213,754 B2
(45) Date of Patent: *May 8, 2007

(54) DYNAMIC PRICING SYSTEM WITH GRAPHICAL USER INTERFACE

(75) Inventors: Jeremy Eglen, Fishers, IN (US); Tobias Switzer, Indianapolis, IN (US); Justin Bakke, Indianapolis, IN (US)

(73) Assignee: Digonex Technologies, Inc., Indianapolis, IN (US)

( * ) Notice: Subject to any disclaimer, the term of this patent is extended or adjusted under 35 U.S.C. 154(b) by 177 days.

This patent is subject to a terminal disclaimer.

(21) Appl. No.: 11/066,372

(22) Filed: Feb. 25, 2005

(65) Prior Publication Data

US 2005/0139661 A1 Jun. 30, 2005

Related U.S. Application Data

(63) Continuation-in-part of application No. 10/084,777, filed on Feb. 27, 2002, now Pat. No. 7,080,030.

(60) Provisional application No. 60/627,449, filed on Nov. 12, 2004.

(51) Int. Cl.
*G06K 5/00* (2006.01)

(52) U.S. Cl. .................... 235/383; 235/380

(58) Field of Classification Search ............... 235/383, 235/381, 380, 375, 462.01; 705/1, 400, 14, 705/26–27
See application file for complete search history.

(56) References Cited

U.S. PATENT DOCUMENTS

| | | | |
|---|---|---|---|
| 5,237,157 A | 8/1993 | Kaplan | |
| 5,963,916 A | 10/1999 | Kaplan | |
| 6,119,100 A | 9/2000 | Walker et al. | |
| 7,080,030 B2 * | 7/2006 | Eglen et al. | 705/26 |
| 7,124,099 B2 | 10/2006 | Mesaros | |
| 2003/0023505 A1 * | 1/2003 | Eglen et al. | 705/26 |
| 2005/0054431 A1 * | 3/2005 | Walker et al. | 463/25 |
| 2005/0139662 A1 * | 6/2005 | Eglen et al. | 235/383 |
| 2005/0149458 A1 * | 7/2005 | Eglen et al. | 705/400 |

* cited by examiner

*Primary Examiner*—Thien M. Le
(74) *Attorney, Agent, or Firm*—Ice Miller LLP

(57) ABSTRACT

A system for dynamically pricing products available from one or more merchants. The system sends a first price for a product from a processor to a customer device, and receives a report of sale for the product at the first price from a merchant computer. The system then determines a second price for the product based at least on the report of sale for the product at the first price, and sends the second price to the client customer device.

32 Claims, 14 Drawing Sheets

DYNAMIC PRICING SYSTEM WITH GRAPHICAL USER INTERFACE

REFERENCE TO RELATED APPLICATIONS

This application is a continuation-in-part of application Ser. No. 10/084,777, filed Feb. 27, 2002, now U.S. Pat. No. 7,080,030 and claims the benefit of Provisional Application No. 60/627,449, filed Nov. 12, 2004, each of which is hereby incorporated by reference.

BACKGROUND OF THE INVENTION

The present invention generally relates to pricing systems, and more specifically, but not exclusively, concerns a pricing display system adapted to display dynamically priced goods via a graphical user interface.

One of the first methods for dynamically displaying fluctuating prices of publicly traded commodities was the ticker-tape machine. As technology advanced, these machines were replaced by electronic displays that simulate a moving ticker-tape. Additionally, non-moving displays are known that display fluctuating prices in real time. Some examples of electronic displays include the graphics generated by news networks during the stock market trading day that reflect the prices of publicly traded stocks. These graphics usually simulate a moving ticker-tape along the bottom of a television screen. Another example of such an electronic display is a Light Emitting Diode (LED) display, such as those commonly used at the various market exchanges, and in the lobbies of brokerage firms.

Additionally, software is available for use with home and business computer systems, as well as hand-held communications and computing devices, that displays in near real-time the prices of various publicly traded commodities. For example, many on-line brokerage services provide their customers with continuously updated prices for stock prices, bond prices, futures prices, and the like. In these situations, the prices for the traded items are those agreed to by buyers and sellers who submit "ask" and "bid" prices.

In the area of merchandise sales and services for hire, such as business-to-business transactions, consumer transactions, and wholesale transactions, prices are set by the seller, or negotiated between a buyer and a seller on an individual basis. This is true for personal property, such as consumer goods, pure intellectual property, such as on-line music, movie, software, and book downloads, as well as for services, such as lawn maintenance, cleaning services, and the like. For example, the iTunes Music Store operated by Apple Computer, Inc., sells downloaded songs for $0.99 each.

Many merchandise and services items, however, are conducive to having their price set by the seller as a function of their demand in the marketplace. This is especially true of pure intellectual property goods, such as downloaded songs, movies, software, and the like. This is also true of items with a short marketable shelf life, such as high-technology items that are in high demand one year and obsolete the next.

For a purely intellectual property good, the cost to distribute, for example, a given sound recording (such as a song) via the Internet, may only be only a few cents, but the demand may vary from 10,000 sales per day to 100 sales per quarter. In another example, a merchant may be able to demand $250 for video card in January, and be forced to "close-out" the same card for $25 in December. It would be desirable to provide a system that dynamically adjusts the price of an item available for purchase to maximize profit, and display the fluctuating price to prospective purchasers in a near real-time fashion.

SUMMARY OF THE INVENTION

A system for dynamically pricing products available from one or more on-line merchants may send a first price for a product from a processor to a customer device, and may receive a report of sale for the product at the first price from a merchant computer. The system may then determine a second price for the product based at least on the report of sale for the product at the first price, and send the second price to the client customer device.

In a further form, they system dynamically adjusts a plurality of prices for a group of on-line merchants. The system may send a set of prices for a product to a client computer that has a graphical user interface, and display the prices via the graphical user interface. Reports of sale may be sent from merchant computers to the system indicating that a product was sold at one or more prices from the set of prices, and the processor may determine new prices for the product based at least on the reports of sale. The new prices may be sent to the merchant computers and to the client computer. The client computer may display the new prices in place of the old prices in the graphical user interface.

Other forms, embodiments, objects, features, advantages, benefits, and aspects of the present invention shall become apparent from the detailed drawings and description contained herein.

DESCRIPTION OF THE PRESENTLY PREFERRED EMBODIMENTS

Figure 1:
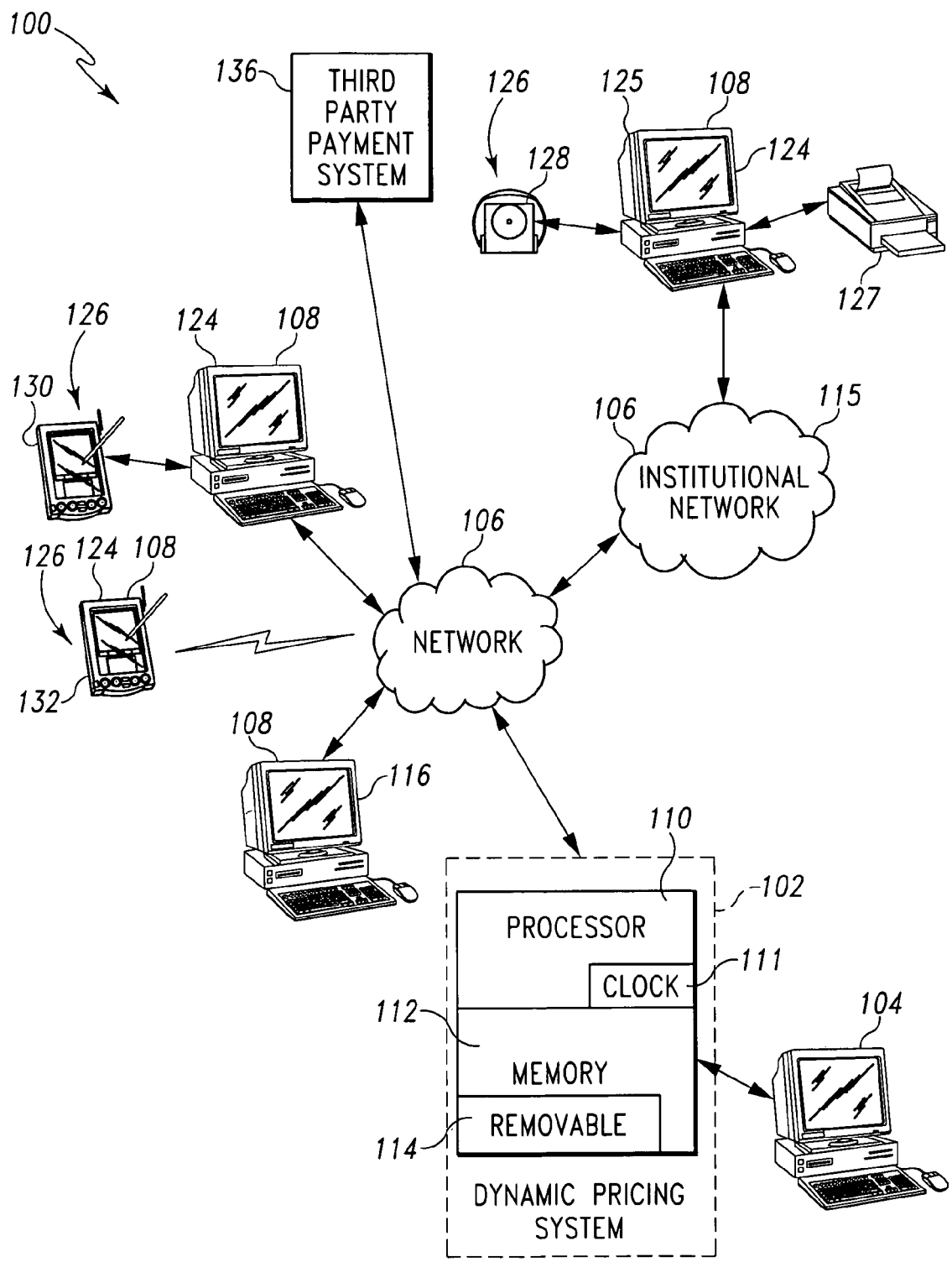
FIG. 1 is a diagrammatic view of a communication system that includes a dynamic pricing system.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 depicts a communication system 100 according to one embodiment of the present invention in a diagrammatic form. The communication system 100 includes a dynamic pricing system 102, an administrative computer 104, a network 106, and one or more user computers/devices (clients) 108. An administrator of the dynamic pricing system manages the dynamic pricing system 102 with the administrative computer 104.

As illustrated, the administrative computer 104 is operatively coupled to the dynamic pricing system 102, and the dynamic pricing system 102 is operatively coupled to the other systems through the network 106. As should be appreciated, administrative computer 104 can also be operatively coupled to system 102 through the network 106. Although only one administrative computer 104 is shown in FIG. 1, it should be understood that system 100 can include multiple administrative computers 104. The administrative computer 104 may comprise a wireless terminal, a desktop computer, a server, a laptop computer, a personal computer, a computer terminal, a personal digital assistant (PDA), a pocket PC, a wireless telephone, a PCS communications device, and/or other types of devices generally known to those skilled in the art. In one embodiment, administrative computer 104 is a personal computer.

The dynamic pricing system 102 may store, dynamically prices, and delivers media content items to the clients 108 over the network 106. The dynamic pricing system 102 may also be operable to receive media content from the clients 108. This media content can include, but is not limited to, music, books, movies, videos, television shows, software, coupons, tickets, web pages, magazines, newspapers, and other type of electronic media. As should be appreciated from the discussion below, the dynamic pricing system 102 may also be operable to dynamically price goods and/or services, such as consumer products and repair services.

For instance, these goods and/or service items can include, but are not limited to, compact discs, digital versatile discs, electronic products, household products, jewelry, furniture, telephone services, and the like. It should be appreciated that items, when purchased, can be delivered electronically over the network 106 and/or physically delivered, for example by a postal carrier. As illustrated, the dynamic pricing system 102 includes a processor 110, a clock 111 and a memory 112. The dynamic pricing system 102 can be located on a single server or distributed over several servers.

In one embodiment, the dynamic pricing system 102 is incorporated into one or more web servers. The processor 110 is used to control the operation of the dynamic pricing system 102. The processor 110 may be comprised of one or more components. For a multi-component form of processor 110, one or more components may be located remotely relative to the others, or configured as a single unit. Furthermore, processor 110 can be embodied in a form having more than one processing unit, such as a multi-processor configuration, and should be understood to collectively refer to such configurations as well as a single-processor-based arrangement. One or more components of the processor 110 may be of electronic variety defining digital circuitry, analog circuitry, or both.

Processor 110 can be of a programmable variety responsive to software instructions, a hardwired state machine, or a combination of these. The clock 111 is used to time events in the dynamic pricing system 102. As should be appreciated, the clock 111 can be incorporated into the processor 110 or can be a stand-alone component. Further, the clock 111 can be hardware and/or software based.

Among its many functions, the memory 112 in conjunction with the processor 110 is used to store media content and manage sales. Memory 112 can include one or more types of solid state memory, magnetic memory, or optical memory, just to name a few. By way of non-limiting example, the memory 112 can include solid state electronic random access memory (RAM); sequential access memory (SAM), such as first-in, first-out (FIFO) variety or last-in, first-out (LIFO) variety; programmable read only memory (PROM); electronically programmable read only memory (EPROM); or electronically erasable programmable read only memory (EEPROM); an optical disc memory (such as a DVD or CD-ROM); a magnetically encoded hard disc, floppy disc, tape, or cartridge media; or a combination of these memory types. In addition, the memory 114 may be volatile, non-volatile, or a hybrid combination of volatile and non-volatile varieties. In the illustrated embodiment, the memory 112 further includes removable memory 114. The removable memory 114 can be in the form of a non-volatile electronic memory unit; an optical memory disk (such as a DVD or CD ROM); a magnetically encoded hard disk, floppy disk, tape, or cartridge media; or a combination of these or other removable memory types.

Network 106 may comprise a global network, such as the Internet, one or more other wide area networks (WAN), a local area network (LAN), wireless communication networks, a wireless local area network (WLAN), satellite networks, Bluetooth networks, a synchronous optical network (SONET), a plain old telephone service (POTS) network, voice-over-IP (VoIP) networks, asynchronous transfer method (ATM) networks, integrated digital subscriber networks (ISDN), frame relay networks, proprietary networks such as provided by America Online, Inc., an institutional network, a cable television network, a public switched telephone network (PSTN), or other types of communications networks generally known to those skilled in the art. In one form of the present invention, the network 106 includes the Internet. In the illustrated embodiment, the network 106 further includes an institutional network 115. It should be appreciated that the network 106 can include more than one institutional network 115. The institutional network 115 is maintained by institutions, such as colleges, universities, high schools, technical schools, other types of learning institutions, and/or charitable organizations. As shown, client devices 108 are operatively coupled to the network 106.

Users access the dynamic pricing system 102 through the client devices 108. The clients 108 and the dynamic pricing system 102 communicate with one another by sending signals across the network 106. In one form, these signals can include HyperText Mark-Up Language (HTML) pages, Extensible Mark Up Language (XML) Pages, and other types transmission protocols. For example, the dynamic pricing system 102 can send a signal corresponding to a web page form across the network 106 to the client 108. The user, by utilizing client 108, can fill out the form and send a signal corresponding to the filled-out form across the network 106 to the dynamic pricing system 102.

By way of non-limiting examples, the clients 108 can include personal computers, both fixed and portable; computer terminals; PDA's; cellular telephones, land line based telephones and the like; television systems, such as televisions, television-based web browsers, digital video recorders, analog video recorders, cable boxes, cable modems, direct broadcast satellite (DBS) boxes, digital versatile disc (DVD) players and video game systems; home entertainment systems, such as stereo equipment, MP3 players, and the like; sound production equipment; video/movie production equipment; or a combination these components, to name a few examples. As shown, the clients 108 are operatively coupled to the dynamic pricing system 102 over the network 106. It should be appreciated that the clients 108 can be operatively coupled to the dynamic pricing system 102 through hardwired and/or wireless connections. The clients 108 are hardwired and/or have software that allows the clients 108 to communicate over the network 106. In one embodiment, the clients 108 are personal computers with software that can include email applications, web browsers, chat programs, and/or proprietary software.

As shown, the communication system 100 may comprise one or more merchant computer systems and/or computing devices 116. The merchant computer 116 can include, but is not limited to, any of the devices that were described above for the clients 108. The merchant computer 116 may be, in one illustrative embodiment, a server computer system, such as a world wide web (Internet) server running Unix, Linux, Macintosh OS X Server, Sun Solaris, Microsoft Windows Server, or the like. The merchant computer 116 may be configured to cooperate with the dynamic pricing system 102. Alternatively, the merchant computer 116 may be configured merely to operate as a web server, in which case the dynamic pricing system 102 may periodically access the merchant computer 116 to obtain current pricing information.

The clients 108 may further include customer devices 124. It should be understood that customer devices 124 can include, but are limited to, the devices as described above for the clients 108. As shown, the customer devices 124 can further include institutional member devices 125. Institutional members, such as students and teachers, are operatively coupled to the dynamic pricing system 102 through the institutional network 115. With customer devices 124, consumers can purchase and/or download products from the dynamic pricing system 102. Consumers can view, listen to and/or interact with the downloadable products they purchased with customer devices 124. For example, when the customer device 124 is a personal computer, the personal computer can be used to store compressed digital media musical content, such as MP3 files. The personal computer then can be used to play, store, and/or "burn" CDs with music from the MP3 files.

In one embodiment, a consumer can download a book with customer device 124 and print out the book with a printer 127 that is operatively coupled to the customer device 124. Alternatively or additionally, the consumer can download the purchased content to one or more portable devices 126. These portable devices 126 can include, but are not limited to, portable music players (such as MP3 players), PDA's, cellular telephones, portable televisions, portable computers, hand held games, e-book readers and/or a combination of these devices. As shown, the portable devices 126 can be operatively coupled to the customer devices 124 in order to download the purchased content. The portable devices 126 can also be operatively coupled to the network 106 through a wireless network connection.

For example, a portable music player 128, such as an MP3 player, can download purchased songs from the customer device 124. It should be understood that dynamic pricing system 102 is not limited to a specific file format, such as the MP3 format for music. Rather, the dynamic pricing system 102 is able to accommodate a wide range of file formats such as WAV and SDMI complaint files for musical works and ASCII and portable document format (PDF) files for text, for example. In the illustrated embodiment, a consumer with customer device 124 can download a purchased book, software program, song, and/or movie to a PDA 130. Moreover, the portable devices 126 can be operatively coupled to the network 106 in order to directly purchase and receive content from the dynamic pricing system 102. As illustrated, a wireless PDA or cellular telephone 132 can purchase and download content directly from the dynamic pricing system 102.

Payments for content purchased on the dynamic pricing system 102 can be handled internally and/or handled by a third party system. In one embodiment, a third party payment service 136 is used process customer payments for downloaded content. In one form, the third party payment system 136 may include the PayFlow system from Verisign. In other forms, the third party payment system 136 may include PayPal, Western Union, a check truncation system via FedWire, a credit card clearing network, or the like.

Figure 2:
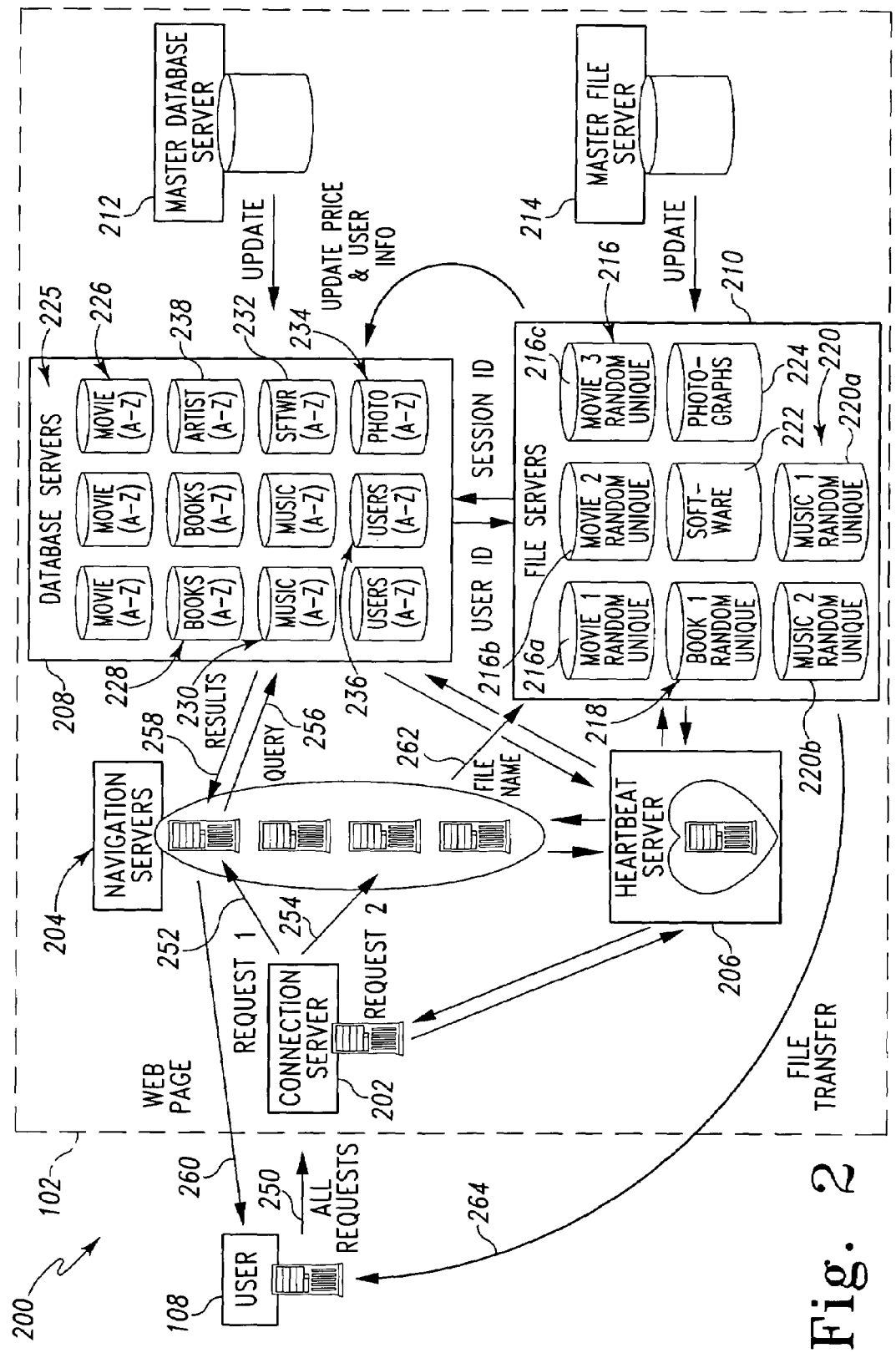
FIG. 2 is a diagrammatic view of a first embodiment of the dynamic pricing system of FIG. 1.

Referring now to FIG. 2, a detailed illustration of a first embodiment of the dynamic pricing system 102 is illustrated. As shown, system 200 includes the dynamic pricing system 102 and one or more clients 108. Although not illustrated in FIG. 2, the client computer 108 in the FIG. 2 embodiment is operatively coupled to the dynamic pricing system 108 through the network 106 in the same manner as illustrated in FIG. 1. In one form, the network 106 for the FIG. 2 dynamic pricing system 102 includes the Internet.

The dynamic pricing system 102 in the FIG. 2 embodiment includes one or more connection servers 202, one or more navigation servers 204, one or more heartbeat (load balancing) servers 206, one or more database servers 208, one or more file servers 210, one or more master database servers 212, and one or more master file servers 214. Although servers 202, 204, 206, 208, 210, 212 and 214 are illustrated as separate units, it should be understood that selected servers or all of the servers can be combined to form a single unit. In one form, the dynamic pricing system 102 utilizes the Linux operating system with programs coded in the JAVA language. As should be appreciated, the dynamic pricing system can use other operating systems, such as UNIX, Microsoft Windows, or the Apple Macintosh operating system, to name a few. Further, the software in the dynamic pricing system 102 can be programmed in other languages besides JAVA, such as C++, Visual Basic, Fortran, Pascal, CGI or PERL, to name a few.

As illustrated, the heartbeat server 206 is operatively coupled to the connection server 202, the navigation servers 204, the database servers 208, and the file servers 210 in order to monitor their load. The connection server 202 is operatively coupled to the navigation servers 204. The navigation servers 204, the database servers 208 and file servers 210 are operatively coupled to one another. The heartbeat server 206 monitors the performance of the other servers and load balances the dynamic pricing system 102.

Periodically, servers 202, 204, 208 and 210 individually send their load status information to the heartbeat server 206.

With the collected status information, the heartbeat server 206 is able to load balance servers 202, 204, 208 and 210. If the heartbeat server 206 does not receive a status signal from one of the servers 202, 204, 208 or 210, the heartbeat server 206 concludes that the server is offline, or otherwise unavailable, and directs the requests to the remaining servers. For example, when one of the database servers 208 goes offline, the heartbeat server 206 can route requests to the remaining database servers 208. Each server receives load information about the other servers from the heartbeat server 206. Based on this load information, a server can send processing requests to a server with a lower load in order to improve the operational efficiency of the dynamic pricing system 102.

The connection server 202 is operatively coupled to the clients 108 over the network 106. The connection server 202 receives and processes all requests from the clients 108. When a request is received, the connection server 202 queries the heartbeat server 206 to find an available navigation server 204. The connection server 202 then forwards the request to the selected navigation server 204. Based on the request and the load information from the heartbeat server 206, the navigation server 204 determines the appropriate database server 208 and/or file server 210 to contact in order to process the request.

The file servers 210 store the media content that is for sale on the dynamic pricing system 102. As illustrated, the file servers 210 can maintain different media types on separate servers. For example, the file servers 210 can include one or more movie servers 216, one or more book/text servers 218, one or more music servers 220, one or more software servers 222, and one or more photograph/picture servers 224. However, it should be understood that the different media types can be stored on a single server or combined on an array of servers.

In the FIG. 2 embodiment, movies, videos, shows, and the like are store on movie servers 216. As shown in the illustrated embodiment, there are three movie servers, first 216a, second 216b and 216c third movie servers. Books, poems, short stories, manuals, news articles and other types of text are stored on the books server 218. The music servers 220 store music, songs, lyrics, sound recordings and the like. In the illustrated embodiment, the music servers 220 include a first music server 220a and a second music server 220b. Software and pictures are respectively stored in the software server 222 and the photograph server 224. The master file server 214 maintains masters of the files stored on the file servers 210 and periodically updates the files stored on the file servers 210. In one form, so as to minimize the risk of corruption, the master file server 214 is offline with respect to the file server 210 and only connects to the file servers 210 when updating the files on the file servers 210.

Depending on popularity, multiple copies of the same work (file) can be stored on multiple file servers 210. Initially, a file containing the work (content) is loaded onto one of the files servers 210, which becomes the "home" file server 210 for the work. For example, during initialization of the dynamic pricing system 102, a song is loaded from the master file server 214 onto the second music server 220b, which becomes the "home" music server 220 for this particular song. As the song becomes popular, the second music server 220b can place a copy of the file containing the song onto the first music server 220a so as to optimize performance of the dynamic pricing system 102. All requests for the song are initially placed with the "home" music server 220, which is the second music server 220b in this example, and if the second, home music server 220b is unable to process a request for the song, the second music server 220b redirects the request to one of the other music servers 220 that has a copy of the song, which in this case is the first music server 220a. Since all requests for downloading of a content file are first placed with the home file server 210, the home file server 210 is able to track and record the number of times the particular content file has been purchased and downloaded. The home file server 210 also perform keeping functions by removing copies of less popular works from the other file servers 210 in order to conserve space in memory 112.

Using the same example, once the song becomes less popular, the second, home music server 220b can delete the copy of the song from the first music server 220a. In one embodiment, different works can have different home file servers 210. Returning to the same example, while the second music file server 220b was the home file server 210 for the first song, the first music file server 220a can be the home file server 210 for a second, different song. In another embodiment, all of the works for a particular type of work (music, books, movies, etc.) can have one file server 210 designated as the home file server 210. For example, in this embodiment, all of the songs loaded into the dynamic pricing system 102 can have the first music file server 220a as their "home" file sever 210.

The database servers 208 store information about the content stored on the file servers 210 and information about users of the dynamic pricing system 102. This information is stored in one or more databases 225 on the database servers 208, and this information can include, but is not limited to, the name/address of the "home" file server 210 for the works; the names of the artists, authors, directors, actors and/or owners of the works; titles; publishers; producers; type of work, such as music, text or video; work category; subject; pricing information and size/length of the work. The databases 225 on the database servers 208 can be a standard file, a combination of files, a standard database program, a relational database, a SQL (Structured Query Language) database, and/or other types of data storage structures as generally known by those skilled in the art. In one embodiment, the databases 225 on the database servers 208 are PostGreSQL databases. As should be appreciated, the databases 225 on the database servers 208 can be other types of database, such as an Oracle or Microsoft SQL Server type databases.

In the illustrated embodiment, the database servers 208 have multiple databases 225 organized by content type. For example, the databases 225 can include one or more movie databases 226; one or more book/text databases 228; one or more music databases 230; one or more software databases 232; one or more photograph/picture databases 234; one or more user databases 236; and/or one or more artist information databases 238. The databases 225 can be active as separate database instances on a single database server 208 or on separate database servers 208. In the illustrated embodiment, the databases 225 are maintained on separate database servers 208. To improve performance, the database servers 208 in one embodiment contain multiple, redundant copies of the same database 225.

In the illustrated embodiment, the database servers 208 in FIG. 2 have three movie databases 226 stored on separate database servers 208 that contain the same information. The movies databases 226 contain information about the movies, videos and/or shows stored in the movie file servers 216. For instance, the movies databases 226 can store the file name along with the name/address of the home movie file server 216; file size; title; writer; director; actors; producers; writers; distributors; movie category, such as drama or action; description; comments; reviews; pricing and demand information; and/or length of the work. The books databases 228 maintain information about the text stored in the books file servers 218.

For example, the books databases 228 can store the file name along with the home book file server 218 for a work; file size; the title; author; owner; publisher; distributor; picture of the author and/or book cover; category, such as biography or mystery; description; comments; reviews; pricing and demand information; and/or size of the work. Similarly, the music databases 230 can store the file name of a song, the location of the file on the home music server 220, song title, artist, author, producer, distributor (label), album name, album picture, picture of the artist, musical category, description, comments, pricing information, demand information, and/or length/size of the song along with other information relating to the song. The software databases 232 and the picture databases 234 respectively store information about the software stored on the software file servers 222 and the pictures stored on the picture file servers 224, and this information can include file name and home file server information 210; pricing and demand information; titles; size; category; owner and/or authorship.

Information about the particular users of the dynamic pricing system 102 is maintained in the users databases 236. The information in the users databases 236 can be used control access to the dynamic pricing system 102 and maintain billing information. Examples of such information include the username and password; first and last names; home and business addresses; email addresses; telephone numbers; session identifiers (ID's) and other session information; and billing and account balance information, to name a few. Biographical and other types of artist information is maintained one the artists databases 238. It should be understood that the above-described databases 225 can include additional information and/or omit certain information.

The master database server 212 maintains masters of the databases 225 stored on the database servers 208 and periodically updates the databases 225 stored on the database servers 208. In one form, so as to minimize the risk of corruption, the master database server 212 is offline with respect to the database servers 208 and only periodically connects to the database servers 208 when updating the databases 225.

All requests, such as a web page requests, from the client 108 (as indicated by arrow 250 in FIG. 2) are routed to the connection server 202. Based on load information from the heartbeat server 206, the connection server 202 routes the request, as indicated by arrows 252 and 254, to the navigation server 204 with the lowest load. In one embodiment, for each subsequent action by the user, the heartbeat server 206 remembers which server was previously used and routes the user to the same server. The navigation server 204 processes the requests. For instance, the navigation server 204 can query one of the databases 225, as shown by arrow 256, in order to process the request. The navigation server 204 selects the particular database server 208 based on the information required (i.e. information about music, books etc.) and the load information from the heartbeat server 206. As depicted by arrow 258, the results from the query are returned to the navigation server 204 that sent the query.

Based on the results, the navigation server 204 generates a web page and sends the page to the client 108, which is depicted by arrow 260. In another example, the navigation server 204 processes a purchase/download request from the client by sending the requested file name to the home file server 210 for the particular file, which is indicated by arrow 262. As depicted by arrow 264, the file server 210 transfers the file to the client 108.

Figure 3:
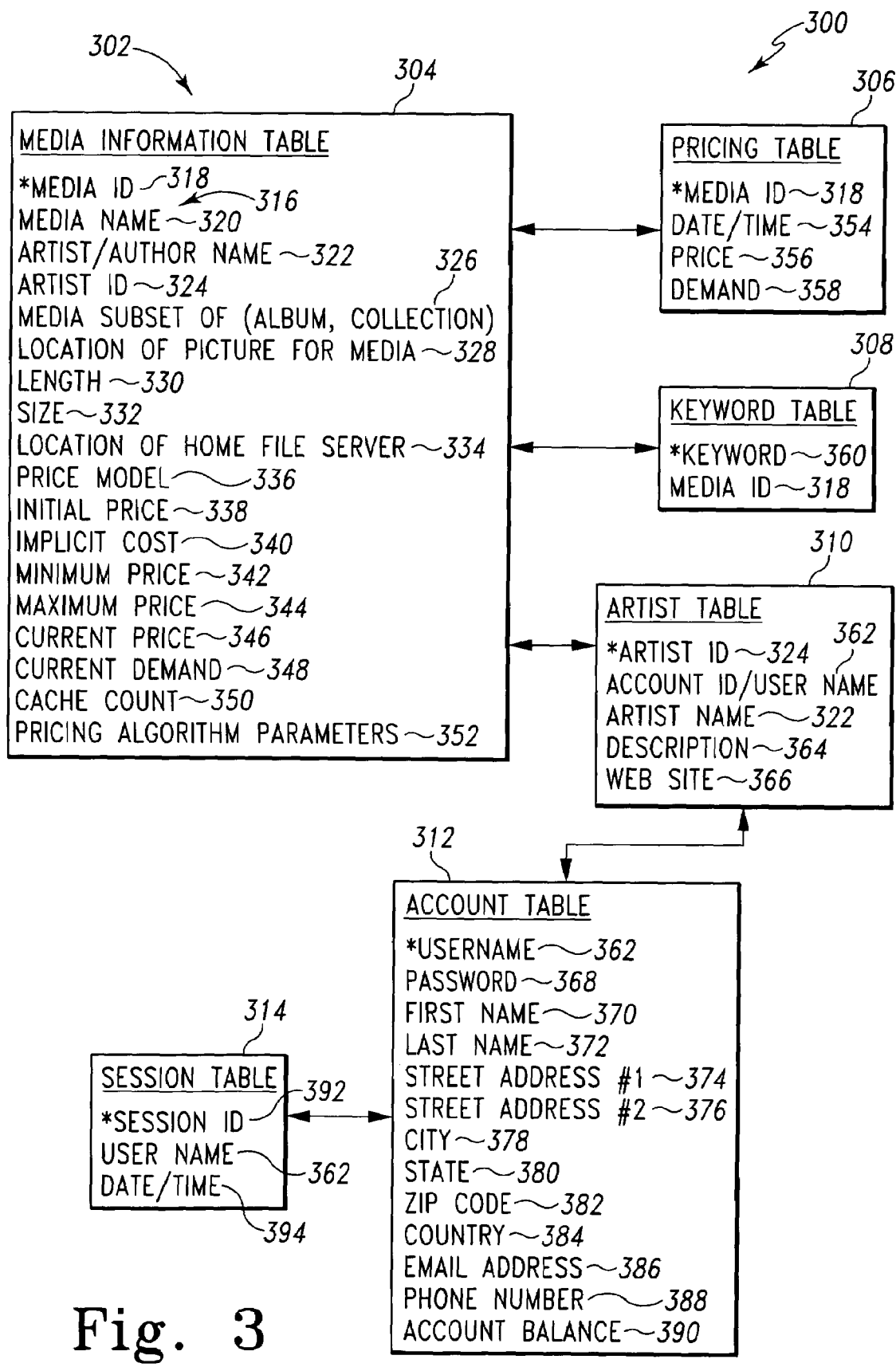
FIG. 3 is a first table structure for the dynamic pricing system of FIG. 1.

FIG. 3 illustrates one embodiment of a table structure 300 of database tables 302 in the databases 225. As should be appreciated, the databases 225 can have different tables 302 and/or table structures 300 than the one shown. The tables 302 in the databases 225 include a media information table 304, a pricing table 306, a keyword table 308, an artist table 310, an account table 312, and a session table 314. The media information table 304 stores information about the media content stored on the file servers 210. In one embodiment, the movie, 226, books 228, music 230, software 232, and photograph 234 databases each include one or more media information 304, pricing 306 and keyword 308 tables. The media information tables 304 include a number of fields 316 that contain information about a particular media content item.

As shown, the fields 316 in the media information table 304 can include a media ID field 318 for storing a unique identifier for an item; a media name field 320, which for example stores the name of the movie, song, program, etc.; an artist/author name field 322 in which the name of the artist is identified; and an artist ID field 324 which contains a unique identifier for individual artists on the dynamic pricing system 102. In FIG. 3, asterisked ("*") fields in the tables 302 are the fields by which the individual tables 302 are indexed. For instance, the media information table 304 is indexed by the media ID field 318. Categorical information, such as the album name and/or the type of music, can be stored in field 326. The filename, path and/or Internet Protocol (IP) address for an image related to the particular content is stored in field 328. For example, field 328 can contain the path and the file name of an image of a book or an album cover.

The physical length of the item, such as the number of pages or playing time, is stored in field 330, and the file size of the item is stored in field 332. The file name and address, such as the path and/or IP address of the home file server 210, of the item is listed in field 334. The price model for dynamically pricing the item, the initial price for the item, and the implicit or marginal cost of the item are stored in fields 336, 338 and 340, respectively. Fields 342, 344 and 346 respectively store the minimum price for the item, the maximum price for the item and the current price for the item.

The current demand, or the number of times the item was purchased within a specified period, is maintained in field 348. A count cache field 350 stores the number of purchases of the item since the last time the current demand was determined. Pricing algorithm parameters field 352 can store information such as the historical pricing and quantity ordered information for the item. In one form, field 352 stores the price and corresponding demand for the item over the last seven periods. It should be appreciated that depending on the dynamic pricing technique used, field 352 can store other parameters, such as the time between purchases.

The pricing table 306 stores information related to the price of particular media content items. The pricing table 306 includes media ID field 318 for identifying the particular item. The date/time, the price at that time, and the quantity demand at that time for the item identified by the media ID field 318 are stored in fields 354, 356 and 358, respectively. The keyword table 308 is used for searching and locating records of items in the databases 225 by keywords. In keyword table 308, the keywords are stored in field 360 and the media ID of the record that contains the keywords is stored in the media ID field 318.

The artist table 310 is maintained in the artist database 238 and contains information about artists, authors, performers, directors, producers, and the like. The artist ID field 324 is a unique identifier for the artist. The username and artist name are respectively stored in fields 362 and 322 in table 310. A description of the artist and their work is maintained in field 364. The address to the web site for the artist is stored in field 366.

As illustrated in FIG. 3, account information for the users of the dynamic pricing system 102 is maintained in account table 312. In one form, the account information table 312 is maintained in each user database 236. It should be appreciated that the user information in table 312 can be encrypted in order to ensure privacy. In table 312, the username and password for accessing the dynamic pricing system are maintained in fields 362 and 368, respectively. As shown, the first name and last name of the user is stored in fields 370 and 372, respectively. The street address of the user is stored in fields 374 and 376. The city, state, zip code, country, email address, and telephone number of the user are stored in fields 378, 380, 382, 384, 386 and 388, respectively. The account balance of the user is maintained in field 390.

Information about user access to the dynamic pricing system 102 is maintained in the session table 314. In one form of the present invention, the session table 314 is stored in the user database 236. As should be appreciated, the session table 314 can be stored in other databases 225. The session table 314 stores a unique session ID in field 392 and the username in field 362. The date/time of the session is maintained in field 394. The tables 302 are linked to one another by various fields 316. For instance, the pricing 306 and keyword 308 tables can be linked to the media information table 304 via the media ID field 318. The session 314 and account 312 tables are linked to one another by the username field 362. The artist table 310 can be linked to table 304 via the artist ID field, and the artist table 310 can be linked to the account table via the username field 362.

Figure 4:
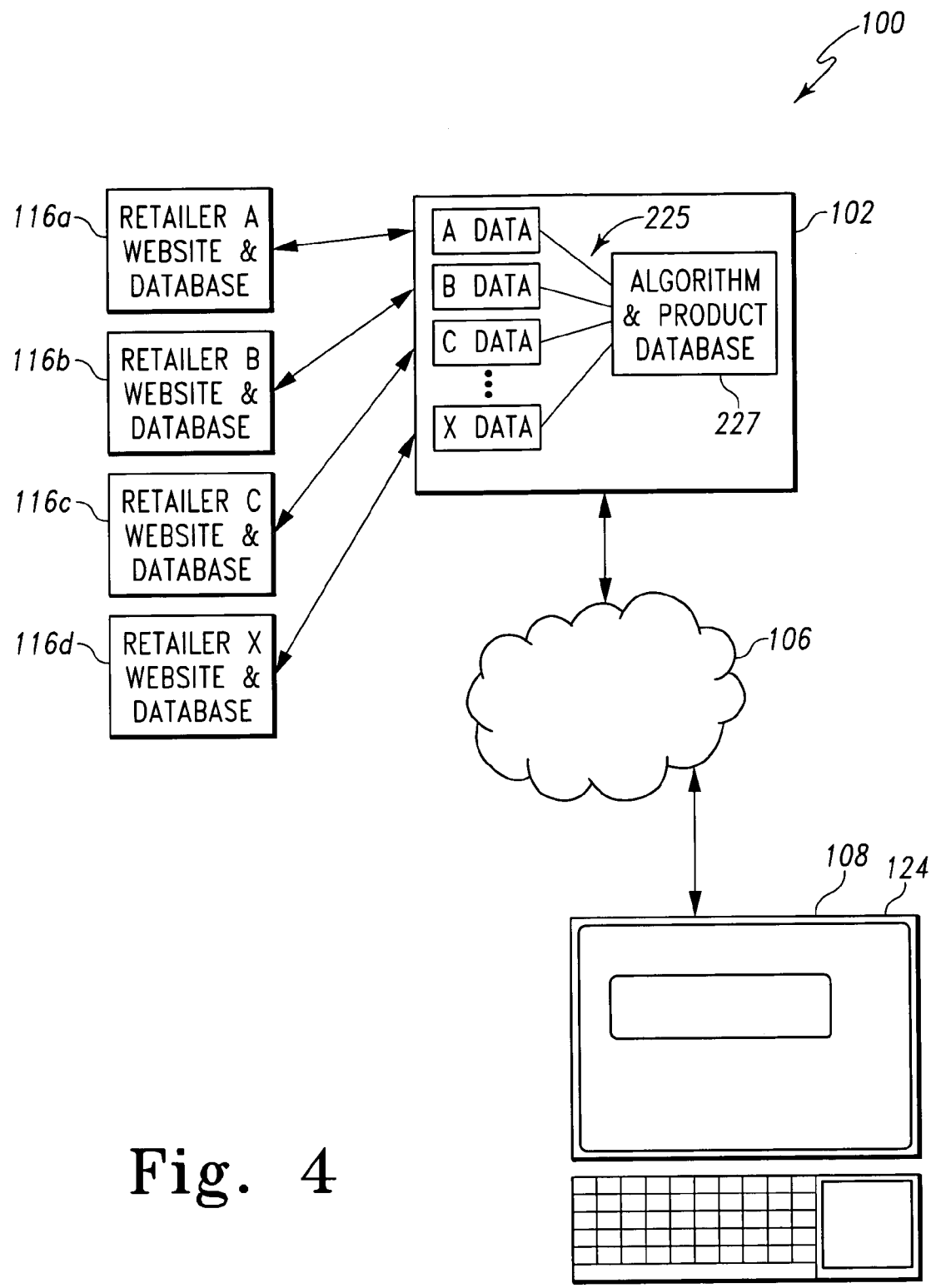
FIG. 4 is a diagrammatic view of a second embodiment of the communication system of FIG. 1.

FIG. 4 depicts a second embodiment of communication system 100 drawn in a simplified block schematic form. As in FIG. 1, the communication system 100 includes the dynamic pricing system 102, the network 106, the client 108 the customer device 124, the client 108, and the merchant computers 116. In the illustrative embodiment shown in FIG. 4, the merchant computers 116 may include web server and database server functionality, and an illustrative merchant computer 116a is shown for a merchant A, an illustrative merchant computer 116b is shown for a merchant B, etc., to illustrate that any number of merchant computers 116 may communicate with the dynamic pricing system 102. The merchant computers 116 are shown coupled directly to the dynamic pricing system 102 for simplicity; in implementation the merchant computers 116 may communicate with the dynamic pricing system 102 via the network 106, as illustrated in FIG. 1.

In the illustrative embodiment illustrated in FIGS. 1–3, the dynamic pricing system 102 stores, dynamically prices, and delivers media content items to the customer device 124. As shown in the embodiment illustrated in FIG. 4, however, the dynamic pricing system 102 is also operable to dynamically price media content from the one or more merchant computers 116. This media content can include, but is not limited to, music, books, movies, videos, television shows, software, coupons, tickets, web pages, magazines, newspapers, and other type of electronic media. Furthermore, the dynamic pricing system 102 is also operable to dynamically price goods and/or services. For instance, these goods and/or service items can include, but are not limited to, compact discs, digital versatile discs, electronic products, household products, jewelry, furniture, telephone services, repair services, cleaning services, and the like. It should be appreciated that such goods, when purchased, would be delivered electronically over the network and/or physically delivered, for example by a postal carrier. Services would be rendered at any suitable location. For example, cleaning services would be likely be rendered at the consumer's location.

As shown in the embodiment illustrated in FIG. 4, the dynamic pricing system 102 may centralize the merchants who operate the merchant computers 116 to form a sort of "superstore" wherein a customer may utilize the customer device 124 to shop for a variety of products and quickly determine costs in near real time. The customer device 124 may execute a graphical user interface 500 to provide this functionality.

Figure 5:
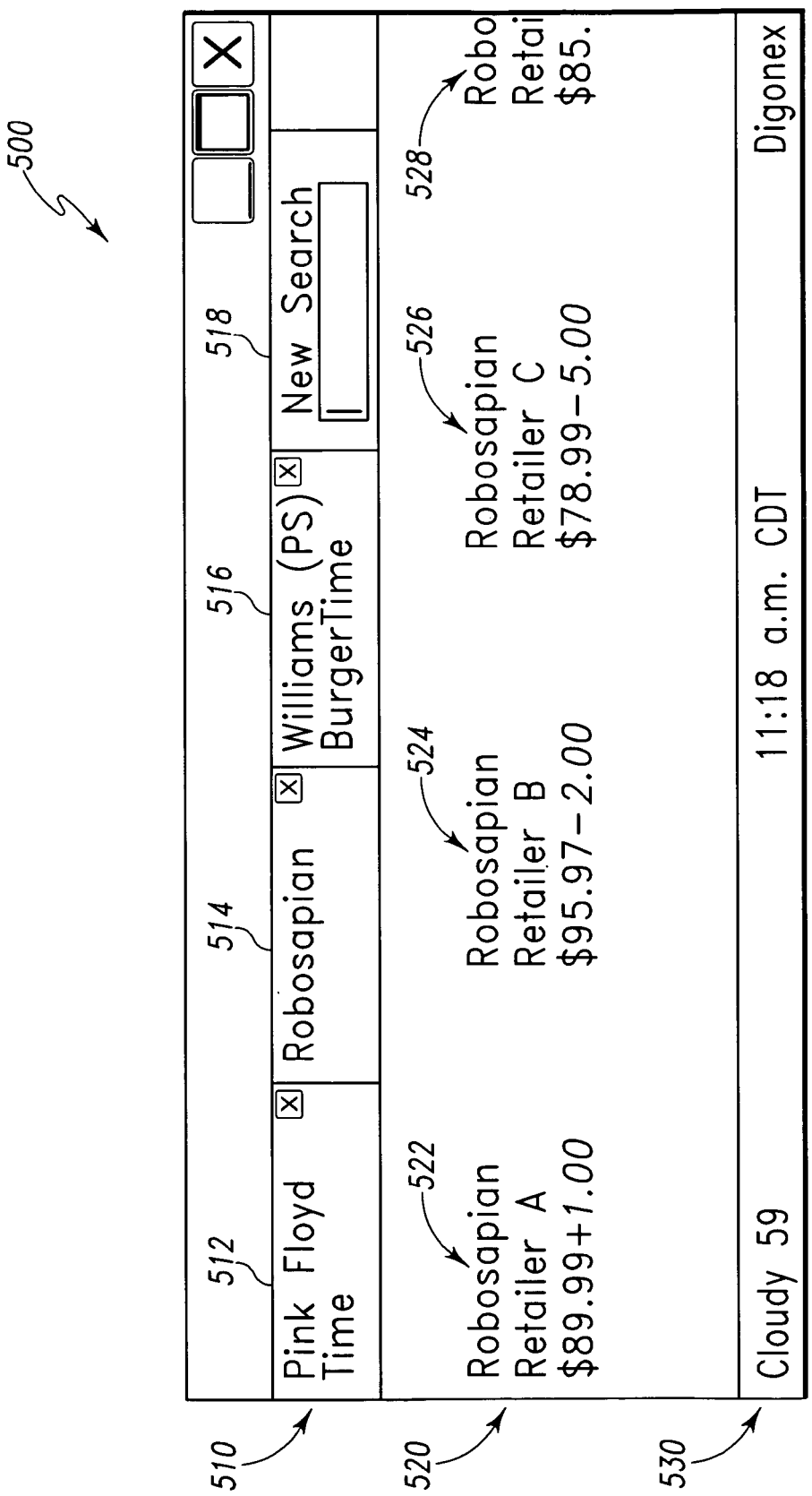
FIG. 5 is a diagrammatic view of an embodiment of a graphical user interface for use with the dynamic pricing system of FIG. 1.

Turning to FIG. 5, one illustrative embodiment of the graphical user interface 500 is shown. The graphical user interface 500 may be an executable client application, such as a Java application, a Windows application, an Apple Macintosh application, a mobile device application such as a Palm OS application, or the like. In one embodiment, the graphical user interface 500 is a widget comprising HTML code, JavaScript, and Cascading Style Sheets (CSS), such as a widget created for use with Konfabulator or Macintosh OS X Dashboard. The graphical user interface 500 could also be a web page, or the like.

The graphical user interface 500 may include a search bar 510, a ticker window 520, and a convenience display 530. The convenience display 530 may be used for advertising, weather updates, or other types of information that may be of interest to the user of the customer device 124. The search tab 518 allows the user to perform a search for a particular product, and obtain pricing and other information for that product. When the user of the graphical user interface 500 inputs a search in the search tab 518, a new search tab 518 appears, and the old search tab 518 is replaced by a product tab, for example, a product tab 512.

Clicking on the "X" button in the upper right corner of one of the product tabs 512–516 will close that particular tab. Each one of the product tabs 512–516 represents the results of one search initiated via the search tab 518. When a product tab is selected, pricing and other information for that product is displayed in the ticker window 520. In the example shown in FIG. 5, the product tab 514 is selected, which corresponds to a "Robosapian" toy, and pricing information is displayed in the ticker window 520 for the selected product for each of the merchant computers 116 that is operated by a merchant which carries the product. As shown by a product listing 522, Merchant A, which operates the merchant computer 116a, is currently offering the product for $89.99. The product listing 522 shows a "+1.00" after the current price to indicate that this is an increase of $1.00 over a previous price. Similarly, a product listing 524 indicates that the merchant computer 116b is currently offering the product for $95.97, which is a decrease of $2.00 from a previous price.

A product listing 526 indicates that the merchant computer 116c is currently offering the product for $78.99, which is currently the lowest price. The graphical user interface 500 may indicate that the product listing 526 is the lowest price for the product by, for example, changing the color of the text, bolding the text, inverting the text, flashing the text, or the like. The product listing 528 is shown scrolling into the ticker window 520. In one embodiment of the ticker window 520, the product listings 522–528 scroll from one side to the other. In other embodiments, however, the product listings 522–528 may fade in and out as a group, scroll from top to bottom (or vice versa), or remain static.

To obtain the information displayed in the product listings 522–528, the operator of the dynamic pricing system 102 may enter into contracts with the merchants who operate the merchant computers 116. The dynamic pricing system 102 may copy data from the merchant computers 116 into an algorithm and product information database 227 as shown in FIG. 4, which may be one of the databases 225 shown in FIG. 2. Where the goods for sale are media, the product information database 227 may include the table structure 300 of database tables 302, as described above. Where the goods or services for sale are not conducive to electronic disbursement, the product information database 227 may include a table structure 600, as described below.

Figure 6:
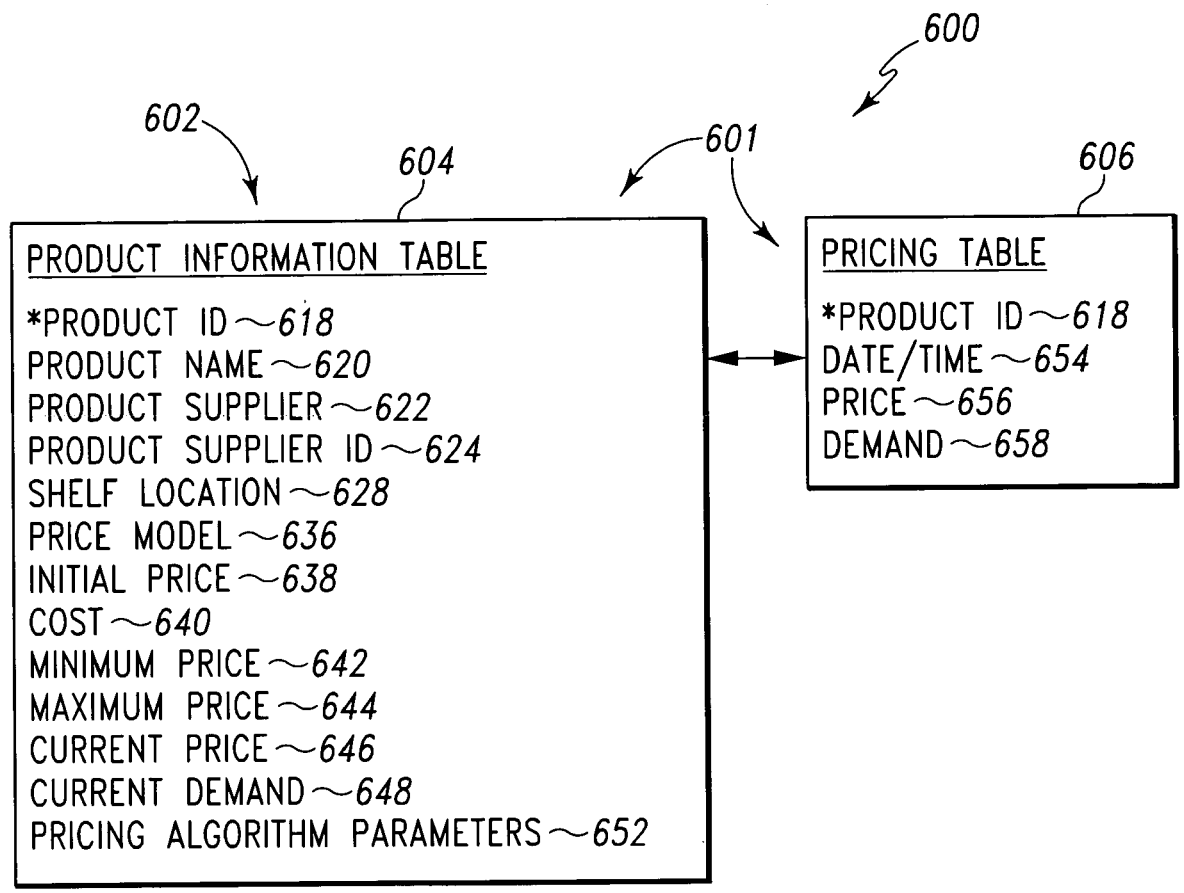
FIG. 6 is a table structure for the dynamic pricing system of FIG. 1.

Turing to FIG. 6, the table structure 600 is shown. It should be appreciated that the information in table structure 600 can be encrypted in order to ensure privacy. A table structure 602 of database tables 601 is shown in the table structure 600. As should be appreciated, the table structure 600 can have different tables 601 and/or table structures 602 other than the ones shown. The tables 601 in the databases 600 include a product information table 604 and a pricing table 606. The product information table 604 stores information about the products available from the merchants who operate the merchant computers 116. The product information table 604 includes a number of fields 616 that contain information about a particular product. The term "table" as used herein refers to a table of a relational database. It will be appreciated, however, that a record from a non-relational database could be used to provide the same functionality. Therefore, the term "table" should be understood to also refer to records, and vice versa.

As shown, the fields 616 in the product information table 604 can include a product ID field 618 for storing a unique identifier for a product; a product name field 620, which for example stores the name a product; a product supplier field 622 in which the name of the supplier of the product to the store is identified; and a product supplier ID field 624 which contains a unique identifier for individual product suppliers. In FIG. 6, asterisked ("*") fields in the tables 601 are the fields by which the individual tables 601 are indexed. For instance, the product information table 604 is indexed by the product ID field 618.

The shelf location for a product, for example the location of the product in a fulfillment warehouse, is stored in field 628. The price model for dynamically pricing the product, the initial price for the product, and the cost or marginal cost of the product are stored in fields 636, 638 and 640, respectively. Fields 642, 644 and 646 respectively store the minimum price for the product, the maximum price for the product and the current price for the product. The current demand, or the number of times the product was purchased within a specified period, is maintained in field 648. Pricing algorithm parameters field 652 can store information such as the historical pricing and quantity ordered information for the product. In one form, field 652 stores the price and corresponding demand for the product over the last seven periods. It should be appreciated that depending on the dynamic pricing technique used, field 652 can store other parameters, such as the time between purchases.

The pricing table 606 stores information related to the price of particular products. The pricing table 606 includes product ID field 618 for identifying the particular product. The date/time, the price at that time, and the quantity demand at that time for the product identified by the product ID field 618 are stored in fields 654, 656 and 658, respectively.

Below a number of techniques for dynamically pricing products on the dynamic pricing system 102 will be described. The dynamic pricing system 102 strives to optimize profit; this typically involves some estimation of the demand curve(s) for the products. The dynamic pricing system 102 in dynamically pricing the products actually never "knows" the demand curve for a product. Generally, the dynamic pricing system 102 continues to raise the price for a product until total profits are reduced. Alternatively, system 102 will decrease the price of a product whenever an increase in price reduces profits. A general description of one embodiment of the pricing algorithm will now be described below. In this embodiment, the dynamic pricing system 102 through processor 110 calculates price adjustments using a logarithmic demand curve that has been found in empirical econometric studies to be the best fitting of algebraically tractable functional form for many retail markets. The quantity of a particular product (q) purchased at a particular price (p) is assumed to take the form of Equation 1 below:

$$\text{Log}[q] = \alpha - \beta p \quad \text{(Equation 1)}$$

where
Log[ ] is a natural logarithm
q=quantity of a product
p=Price of the product
$\alpha, \beta$=parameters.

With Equation 1 above, parameters $\alpha$ and $\beta$ are unknown. In order to solve these parameters, the technique according to the present invention uses data observed through sales of products to estimate these parameters. Another factor in determining the optimal price for a product is that the demand curve for a product will change over time. Therefore, in one embodiment, the dynamic pricing system 102 does not base its price upon very old data. Still yet another obstacle the dynamic pricing system 102 faces in determining pricing for a particular product is that customer demand at the time periods in which a particular product is demanded varies depending on the nature of a particular product. The profit ($\text{profit}_t$) made in a particular time period (T) is described below in Equation 2:

$$\text{profit}_t = q_t(P_t - c) \quad \text{(Equation 2)}$$

where
t=time period
$\text{profit}_t$=profit for a particular product at time period t
$q_t$=quantity of products sold time period t
$P_t$=price of the product at time period t.
c=marginal cost.

It should be noted that for this embodiment the fixed costs are ignored in Equation 2. Equation 2 only considers the marginal cost (c) caused by changes in sales volumes for a particular product. However, it should be understood that in other embodiments fixed costs can be a factor for dynamically pricing a product. Other factors may be incorporated into Equation 2 in order to determine the optimal profit. For example, if the time period (t) was twelve-hours (12 hours), one would expect that more sales would occur during the day as opposed during the middle of the night. This situation could result in undesirable, dramatic price fluctuations. To compensate for the difference between the periods, Equation 2 can factor in one or more additional variables in order to stabilize prices. Alternatively or additionally, the length of the time periods can vary in order to compensate for the differences between the periods. In another form, the price fluctuations between day and night are left alone so that shoppers are given an incentive to shop at night when sales are typically lower.

With the above background, an example will now be used to describe how prices are dynamically adjusted according to one embodiment of the present invention. In an initial time period (t=1), an initial price for a product is set. For example, the initial price of a product could be set to 90¢ ($0.90), depending on what the merchant who operate the merchant computer 116 believes is appropriate. In this particular example, $P_1=\$0.90$. In the second time period (t=2), the processor 110 of the dynamic pricing system 102 changes the price in order to get a sample of the change in consumer demand at a differing price levels. In the current example, the price of a particular product is raised by 10%, which is shown in equation 3 below.

$$p_2 = p_1 + 0.10 p_1 \text{ (or } p_2 = p_1 \times 1.10) \quad \text{(Equation 3)}$$

where $p_2$=price in the second time period.

Figure 7:
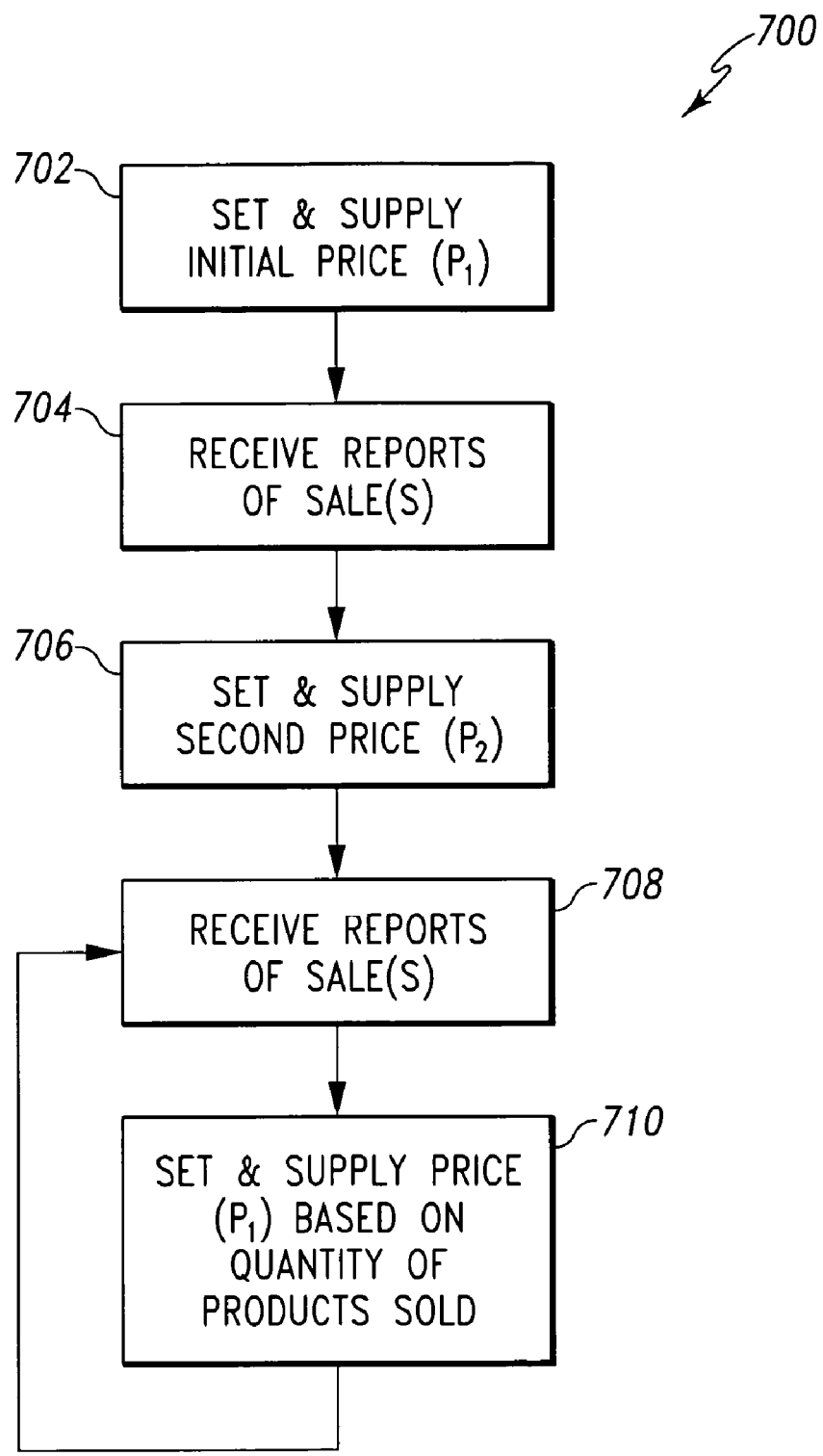
FIG. 7 is a flow diagram illustrating a first process for dynamically pricing a product.

Flow diagram 700 in FIG. 7 illustrates this technique according to one embodiment of the present invention. The technique described below should be understood as applicable to any type of product on the dynamic pricing system 102. In stage 702, the initial price ($p_1$) of a product for sale is set by the dynamic pricing system 102 and displayed via product pricing units 240. One or more reports of sales of the product are received by the dynamic pricing system 102 in stage 704, and the dynamic pricing system 102 stores in memory 112 the price ($p_1$) and quantity sold ($q_1$) for the first time period. The length of the time periods in this embodiment can for example be by second, by minute, hourly, daily, weekly, monthly, yearly, or some other time increment (e.g., every 33.5 seconds). In one form, the time interval for each period is one day. For instance, the first time period would be day 1, the second time period would be day 2, and the third time period would be day 3. After the first time period, the processor 110 of the dynamic pricing system 102 in stage 706 sets a second price ($p_2$) for the product and supplies the second price ($p_2$) for the product to product pricing units 240 (see, Equation 3). The processor 110 in stage 706 can either increase or decrease the price of the product.

For explanation purposes, we will assume that the dynamic pricing system 102 increased the price in stage 706. In stage 708, the dynamic pricing system 102 receives reports of a quantity of sales ($q_2$) for the product from the merchant computers 116. In time period three (t=3), the price and quantity sold information from the previous two periods is used to determine whether the price change from the first period to the second period increased profits or not. If profits increased ($q_2(p_2-c) > q_1(p_1-c)$) then increasing prices further may be profitable. If profit decreases, however, then a price decrease from initial price ($p_1$) may be appropriate. The changes in prices depend on the functional form of the particular demand curve for the particular product for sale. Using a logarithmic demand curve, Equation 4, which is shown below, can be used to calculate profit.

$$\text{profit} = q(p-c) - Exp(\alpha - \beta p)(p-c) \quad \text{(Equation 4)}$$

From Equation 4, the profit maximizing price can be determined to be as shown below in Equation 5.

$$p = \frac{(1+c)}{\beta} \quad \text{(Equation 5)}$$

A nice property of Equation 5 is that price is not dependent upon unknown parameter $\alpha$. However, the optimal price still depends on unknown parameter $\beta$. As should be appreciated, a number of techniques can be used to estimate the parameters $\beta$. In one technique, the two observations of price (p) and quantity (q) are combined from periods one and two to generate an estimate of $\beta$. Equations 6 and 7 illustrate this technique.

$$\text{Log}[q_1] = \alpha - \beta p_1 + \epsilon_1 \quad \text{(Equation 6)}$$

$$\text{Log}[q_2] = \alpha - \beta p_2 + \epsilon_2 \quad \text{(Equation 7)}$$

Where $\epsilon_1$ and $\epsilon_2$=sampling error.

Equations 6 and 7 can be combined in order to determine parameter $\beta$, which is shown below in Equation 8.

$$\beta = \{\text{Log}[q_2] - \text{Log}[q_1] - \epsilon_2 - \epsilon_1\} / (p_1 - p_2) \quad \text{(Equation 8)}$$

It is assumed that the longer interval time between price changes, the smaller expected sampling error ($\epsilon_1$, $\epsilon_2$) would be relative to the quantities sold. Over a long period of time, the expected sampling error terms would be zero. This yields Equation 9 below.

$$\beta = \frac{\{\text{Log}[q_2] - \text{Log}[q_1]\}}{(p_1 - p_2)} \quad \text{(Equation 9)}$$

The profit maximizing, or optimal price, can be determined by combining Equation 5 with Equation 9, which yields Equation 10 below.

$$p_{t-1,opt} = \frac{(1+c)(p_{t-2} - p_{t-1})}{\{\text{Log}[q_{t-1}] - \text{Log}[q_{t-2}]\}} \quad \text{(Equation 10)}$$

Where $p_{t-1,opt}$=optimal price for time period t−1

In order to prevent extreme fluctuations in pricing between two periods, the change in pricing between two different periods is dampened so that wild fluctuations in pricing do not occur. The amount of dampening can be adjusted depending on the amount of aggressiveness in pricing the administrator intends to use. The estimation of $\beta$ is highly subject to sampling error. Therefore, to be conservative, a geometric mean between the previous price and the new estimated optimal price may be taken. In addition, absolute bounds on how much a price adjustment between two periods may further be set to further dampen pricing. This is done just in case the estimation procedure gives an inaccurate estimate. A generic form of this technique used by the dynamic pricing system 102 is shown in Equation Set 11 below.

Set $$p_t = p_{t-1} - L^- \text{ if } p_{t-1,opt} < p_{t-1} - L$$

$$p_t = (p_{t-1})^w (p_{t-1,opt})^{(1-w)} \text{ if } p_{t-1} - L \leq p_{t-1,opt} \leq p_{t-1} + L \quad \text{(Equation Set 11)}$$

$$p_t = p_{t-1} + L \text{ if } p_{t-1,opt} > p_{t-1} + L$$

Where

L=limit bounds

W=weighting factor.

Limit bounds (L) in Equation Set 11 is used to limit how much the price will be adjusted between two periods. For example, if the optimal price for the previous time period is greater than the limit bounds (L) from the actual price, then the dynamic pricing system 102 sets the price for the current time period ($p_t$) to the limit bound (L) from the previous time period price ($p_{t-1}$). Weighting factor (W) is used as a geometric mean of weighting the different prices between the optimal and the actual pricing. For example, the weighting factor is used when the optimal price for the previous time period ($p_{t-1,opt}$) is within the limit bounds (L). The geometric mean of the weighting factor (W) allows the price to move in the direction of the estimated optimal price ($p_{t-1,opt}$), but forces the price to move slowly. Aggressiveness in price adjustments can be adjusted by adjusting the weighting factor W. The more comfortable the administrator is with the pricing estimates, the more aggressive the pricing can become by adjusting weighting factor W.

For example, at time period one, the dynamic pricing system 102 priced the product at $1.00 ($p_1$=$1.00) and the number of the products that were purchased during time period one was 150 ($q_1$=150). During time period two, the dynamic pricing system 102 priced the same product at $1.40 ($p_2$=$1.40) and the number products that were purchased during time period two was 100 ($q_2$=100). In time period three, the dynamic pricing system 102 determines the optimal price to be the following in Equation 12 (stage 710). In Equation 12, we have assumed the marginal cost of supplying an additional product to be ten cents (c=0.1) for this example.

$$p_{2,opt} = \frac{(1+c)(p_1 - p_2)}{\{Log[q_2] - Log[q_1]\}} \quad \text{(Equation 12)}$$

$$p_{2,opt} = \frac{(1+0.1)(1.00 - 1.40)}{\{Log[100] - Log[150]\}} = 1.09$$

With the bounds equals $0.50 (L) and weighting factor W=0.8 in this example, the dynamic pricing system 102 uses Equation Set 13 below in order to determine the dynamic price at time period three ($p_3$).

Set $p_3 = p_2 - 0.50$ if $p_{2,opt} < p_2 - 0.50$ $p_3 = (p_2)^{0.8}(p_{2,opt})^{0.2}$ if $p_2 - 0.50 \leq p_{2,opt} \leq p_2 + 0.50$ (Equation Set 13)

$p_3 = p_2 + 0.50$ if $p_{2,opt} > p_2 + 0.50$ $p_3 = (1.40)^{0.8}(1.09)^{0.2} = \$1.33$ In stage 710, the dynamic pricing system 102 with processor 110 sets the revised sale price for the product and stores the price in memory 110. Using the above example, the dynamic pricing system 102 would then set the price of the product to $1.33 in time period three. For subsequent time periods, as sales reports are received in stage 708, the dynamic pricing system 102 continues to periodically re-price the product according to the Equation Set 11.

Equation 14 below is a generic form for another technique of dynamically pricing a product according another embodiment of the present invention.

New Dynamic price=Price Basis×Dynamic Price Modifier (Equation 14)

In Equation 14, the price basis is modified by the dynamic price modifier so as to result in a new dynamic price for a product. In one form, the dynamic price modifier is some measure of change in demand for one or more products being priced. In another form, the dynamic price modifier can take into account profitability of different price levels. It should be understood that the dynamic pricing modifier can take into account other factors. These factors can include, but are not limited to: the marginal and/or fixed costs of the product; price ceilings and/or floors for the product; the popularity of the product as measured by third parties; and reviews of a product.

Generally, the dynamic price modifier increases the price of a product when demand for that product increases and reduces the price of a product when the demand for the product decreases. In one form, the dynamic pricing modifier is based on the differences between the quantities sold at specific intervals. For instance, these intervals can be by second, by minute, hourly, daily, monthly, or yearly. In another form, the dynamic pricing modifier is based on the time between successive purchases. For example, if the time delay between successive purchases decreases, the dynamic pricing system 102 can infer that demand is increasing and thus increase the price for the product.

Figure 8:
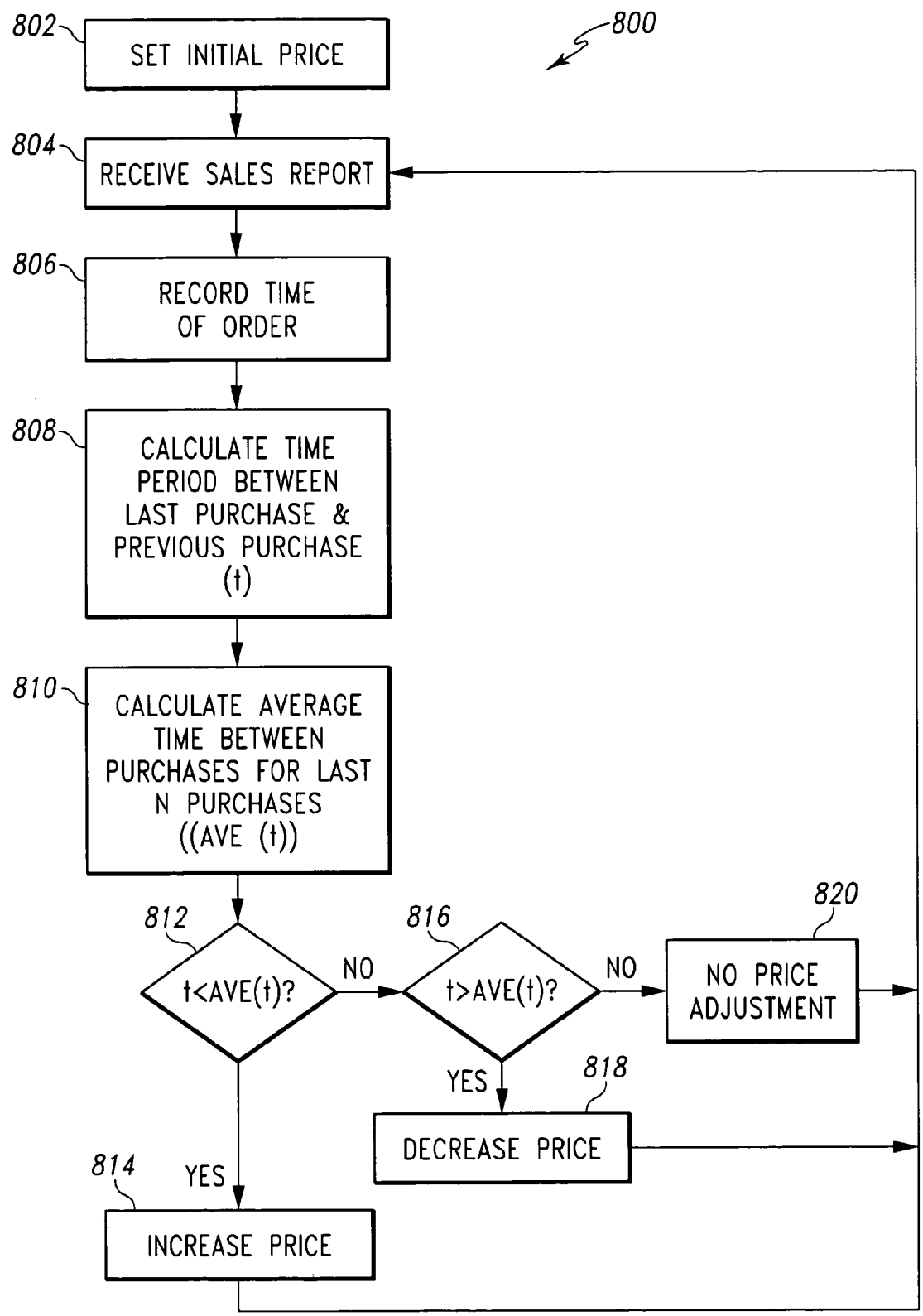
FIG. 8 is a flow diagram illustrating a second process for dynamically pricing a product.

FIG. 8 is a flow diagram 800 that illustrates a technique for dynamically pricing products according to another embodiment of the present invention. In the technique illustrated in FIG. 8, the price of a product is changed based on the time delay between sales of the product. An initial price for the product on the dynamic pricing system 102 is set in stage 802. The system administrator can set the initial price for the product. Alternatively or additionally, the dynamic pricing system 102 in this and other embodiments can automatically set the initial price based on default prices and/or historical prices for similar products stored in memory 112. In one form, the administrator through the administrative computer 104 sets the initial price for a product on the dynamic pricing system 102. In stage 804, the processor 110 of the dynamic pricing system 102 receives a sales report from the merchant computers 116 over the network 106. From the clock 111, the processor 110 in stage 806 stores in memory 112 the time the order was received.

In stage 808, the processor 110 determines the time period (t) between the current purchase and the previous purchase of the product. In another form, the clock 111 is reset after each purchase such that the processor 110 stores in memory 112 the time period (t) between the current and previous purchases. Initially, at the first purchase of the product, the time period (t) between purchases can be based on the time delay between when the product was originally available on the dynamic pricing system 102 and when the first purchase was made. The time when the product was first available on the dynamic pricing system 102 can be stored into memory 112 in stage 802. In another form, the processor 110 waits to receive a second order from a customer before calculating the time delay (t) between purchases. It should be appreciated that the dynamic pricing system 102 can record a series of purchase times before dynamically pricing a product.

In stage 810, the processor 110 determines the average time delay ((AVE(t)) between purchases. In one form, the average time delay is calculated for all purchases, and in another form, the average time delay is calculated for a set number (N) of previous purchases so as to take into account shifts in the demand curve. In one particular form, the average time delay is calculated for the last 10 periods (N=10). Equation 15 below illustrates how the average time delay is calculated.

$$AVE(t) = \frac{t_i + t_{i-1} + \cdots + t_{i-N+1}}{N} \quad \text{(Equation 15)}$$

Where
AVE(t)=Average Time Delay Between Purchases
$t_i$=Time delay Purchase Period i
N=Number of Periods Generally, when the current time delay is less than the average time delay, it can be inferred that demand for the product has increased. Conversely, if the current time delay is greater, then it can be inferred that demand has lowered. In stage 812, the processor 110 of the dynamic pricing system 102 determines whether or not the current time delay between purchases (t) is less than average time delay between purchases (AVE(t)). If the current time delay is less than the average, the processor 110 increases the price of the product in stage 814. In one form of the present invention, the price would be adjusted according to Equation 16 as illustrated below. As can be seen below, Equation 16 is derived from Equation 14.

$$P_{i+1} = P_i \times \frac{AVE(t)}{t_i} \quad \text{(Equation 16)}$$

Where
$P_{i+1}$=New Dynamic Price
$P_i$=Price Basis, or Current Price for Period i.

In Equation 16, the price basis is the price of the product for the latest period, and the dynamic price is the new price for the product. For example, if the price of the product was currently $1.20, the average time between purchases was 20 seconds and the current delay between purchases was 15 seconds, the new price for the product would be $1.60 (1.20×20÷15=1.60). In another form of the present embodiment, the processor 110 takes into account of the upper price, or price ceiling, and lower price, or floor price, for the product. As previously mentioned, the system administrator can specify upper and lower price limits for a particular product. If, for example, the calculated new dynamic price exceeded the upper price limit, the processor 110 in stage 814 would set the new price to the upper limit price. Similarly, if the calculated new dynamic price is less than the lower limit price, processor 110 in stage 818 would set the new price to the lower limit price.

If the current time delay (t) between purchases is not less than the average time delay between purchases in stage 812, then the processor 110 in stage 816 determines whether the current time delay (t) between purchases is greater than the average time delay between purchases. If so, then it can be inferred that demand for the product has lowered, and the processor 110 in stage 818 decreases the price of the product. In one form, the processor 110 reduces the price using Equation 16 (above). For example, if the price of the product was currently $1.20, the average time between purchases was 15 seconds and the current delay between purchases was 20 seconds, the new price for the product would be $0.90 (1.20×15÷20=0.90).

As should be appreciated, the processor 110 can consider other factors, such as the marginal cost, when adjusting the price in stage 818. For instance, in one form, the processor 110 also determines in stage 818 whether the new price is less than the predefined lower price limit, or floor, for the product. If the new price is less than the lower price limit, then processor 110 only sets the new price at the lower limit. In another embodiment, to prevent wild fluctuations in price, the dynamic pricing system 102 in stages 814 and 818 can dampen the price changes between periods. When in stage 816 the current time delay (t) between purchases is not greater than the average time delay between purchases, the processor in stage 820 makes no price adjustment. In another embodiment, to prevent the price from being locked into a local maximum price, the processor 110 in stage 820 randomly adjusts the price.

Figure 9:
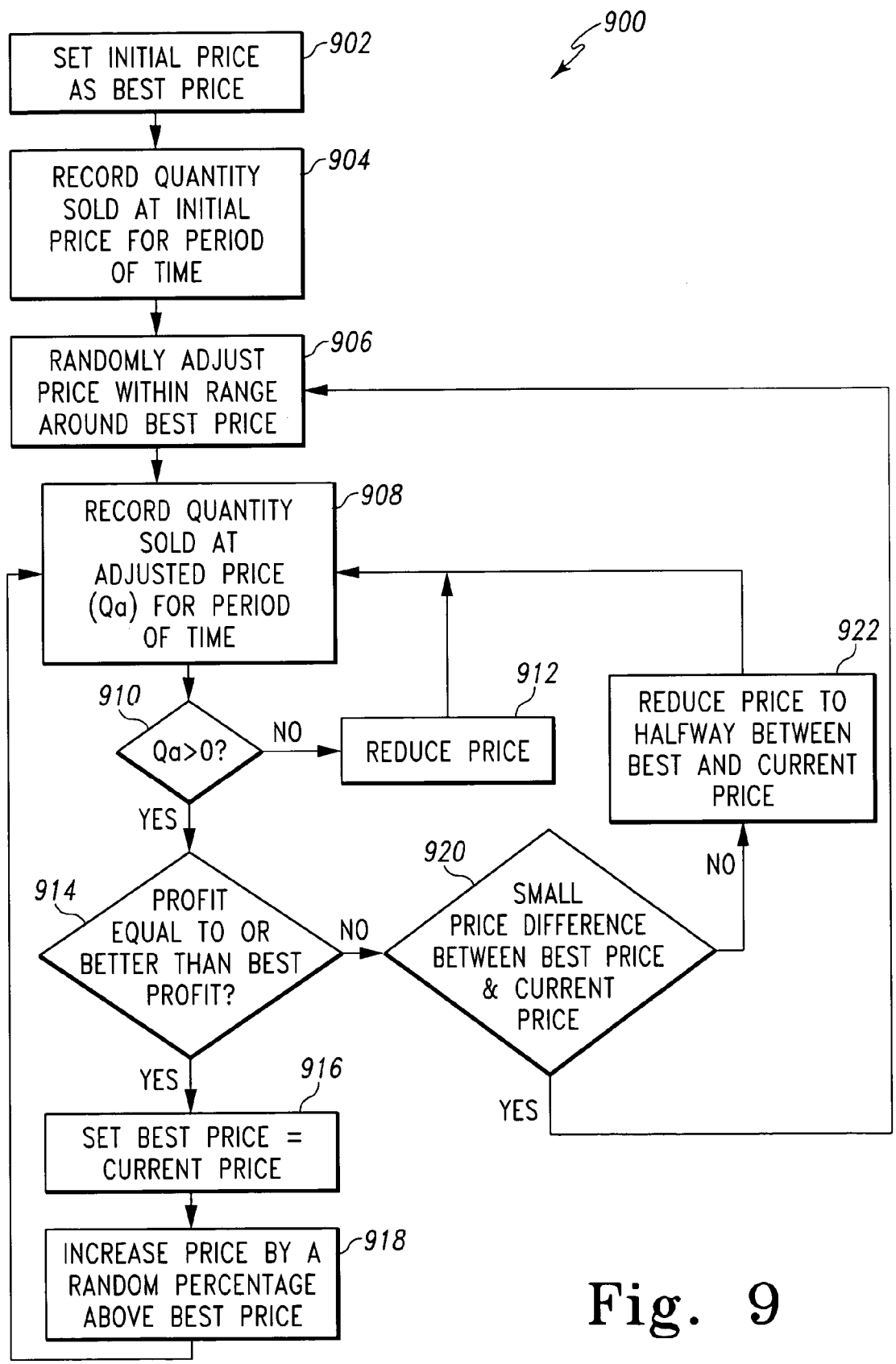
FIG. 9 is a flow diagram illustrating a third process for dynamically pricing a product.

A technique for dynamically pricing products according to another embodiment of the present invention will now be described with reference to flow chart 900 in FIG. 9. In this technique, the database 800 records the number purchases of each product in the dynamic pricing system 102. In one form of this embodiment, a dynamic pricing system 102 periodically updates the prices of each product for sale. The periodic update can be for every second, every minute, hourly, monthly, and/or yearly, to name a few time periods. In one form, the price of individual products is updated nightly. In another form, the prices are updated every minute. Each product for sale and/or type of product for sale can be dynamically priced at different intervals and/or use different pricing techniques depending upon the nature of the product sold. For example, higher priced products, which sell at a slower rate, may have their prices less frequently updated as compared to lower ticket products, which sell at higher volumes. Further, groups of products can be aggregately priced together.

As mentioned above, a system administrator can set the initial price for a product. In stage 902, the dynamic pricing system 102 stores in memory 112 the initial price as the current best price for the product. The processor 110 in stage 904 stores in memory 112 the number of sales of the product at the initial price for a specified time interval and the profit generated (best profit). In one form, the pricing and quantity information is updated daily in the tables 802 of the database 800. After the specified time interval, the processor 110 randomly changes the price within a range around the best price in stage 906. In one form, the dynamic pricing system 102 randomly adjusts the current price within −5% to +5% of the best price. As should be understood, the price can be randomly adjusted within different ranges.

In another form, the price is randomly adjusted without having specified upper range limits. In stage 908, the processor 110 records in memory 112 the quantity order ($Q_a$) at the adjusted current price for the same time interval as in stage 904 (for example, daily or every minute). The processor 110 in stage 910 checks to see if the quantity sold in the last time interval was greater than zero (0). If not, the processor 110 in stage 912 reduces the current price.

For example, the processor 110 can reduce the price by $0.10 increments when there are no sales of the product within the specified period. In another form, the price is lowered by a percentage of the current price, such as 10% of the current price. If the price reduction in stage 912 would reduce the current price below the lower price limit, when specified, the process 110 sets the current price to the lower limit. As mentioned above, the lower limit may be based in part on the marginal and/or fixed costs for the product. After the price is reduced in stage 912, the processor 110 in stage 908 records the quantity sold at the new reduced price for the specified time interval. In an alternate form, the processor 110 in stage 912 increases the time interval in which the quantity sold is recorded in stage 908. As should be appreciated, the processor 110 can both reduce the price and increase the time interval in stage 912.

When in stage 910 the quantity sold at the adjusted price is greater than zero, the processor 110 determines whether the profit at the current price is at least equal to the best profit stored in memory 112. In one form, the processor 110 determines profit by using Equation 2, above. As should be appreciated, the dynamic pricing system 102 can take into account other factors when determining the profit. For example, these factors can include fixed costs and marginal costs, to name a few. If in stage 914 the current profit is equal to or better than the best profit at the best price, which is stored in memory 112, then the processor 110 in stage 916 sets the current price as the best price in memory 112. In one form, the processor 110 also stores in memory 112 the quantity sold at the now best price such that profit can be calculated. In another form, the processor 110 stores in the memory 112 the current profit as the best profit.

Following stage 916, the processor 110 randomly increases the price for the product within a specified range above the current price. This range limit can be predefined and/or determined through historical data. In one form, the random price is generated within a range from 0% to 10% above the current price. It should be appreciated that the processor 110 can use a number of techniques for generating the random (pseudo-random) numbers as would occur to those of ordinary skill in the art. When an upper limit in price is defined, the price of the product will only be increased to the upper limit price. After the price is increased in stage 918, the processor 110 proceeds to stage 908 and records the quantity sold ($Q_a$) at the new adjusted price. By changing the best price in stage 916 even when the current profit is equal to the best profit in stage 914, the dynamic pricing system 102 removes old best prices that may be based on a different demand curve.

In another alternative embodiment, the processor 110 in stage 914 determines whether the profit at the current price is better than the profit at the recorded best price. If so, the processor 110 proceeds to stage 916. If the current profit is equal to the best profit, then the best price remains the same, the current price is not adjusted, and the processor 110 proceeds to stage 908.

When in stage 914 the current profit is less than the best profit, the processor 110 in stage 920 determines whether there is a small price difference between the current price and the best price. The small difference can be based on a percentage basis between the prices and/or by a fixed amount. In one form, the small price difference is less than or equal to a one-percent (1%) change the price. In another form, the small price difference is two-cents ($0.02). It should be understood that other values can be used for the price differential. If there is a small price difference between the current price and the best price, the processor 110 proceeds to stage 906 and randomly adjusts the prices within a range around the best price.

Stage 920 reduces the likelihood that the best price will be stuck at a local maximum in profit. When this problem is not a concern, stage 920 can be omitted. If there is not a small difference in price between the best and current prices in stage 920, the processor 110 in stage 922 reduces the current price to halfway between the current price and the best price. For instance, if the current price is $1.00 and the best price is $0.90, the new adjusted price would be $0.95. As should be appreciated, the price in stage 922 could be reduced by some other fraction of the price differential between the current price and the best price, besides one-half. In one form, if the reduced price is lower than the lower price limit for the product, then the new adjusted price in stage 922 is set to the lower price limit for the product. After reducing the price in stage 922, the dynamic pricing system 102 proceeds to stage 908 and tracks the quantity sold at the new adjusted price. As shown in FIG. 9, the dynamic pricing system 102 using the technique illustrated in flowchart 900 continues to periodically adjust the price of products.

In another illustrative embodiment, the period of time between recording the quantity sold is variable. This technique can be used in the applicable, above-described techniques for dynamically pricing products, but instead "quantity" value in this technique is replaced with "quantity/length of time period" value. For example, in stage 908 of flow chart 900, the "quantity sold/length of time period" value is recorded when the time period is variable. The dynamic pricing system 102 for instance would record one-hundred products per hour (100 products/hour) when one-hundred and fifty (150) products are sold in a one and a half hour (1.5) time period. Recording the "quantity/length of time period" values may improve sampling during slow order periods, such as at night. As should be appreciated, different products for sale on the dynamic pricing system 102 may use different techniques for dynamically pricing the products.

Figure 10:
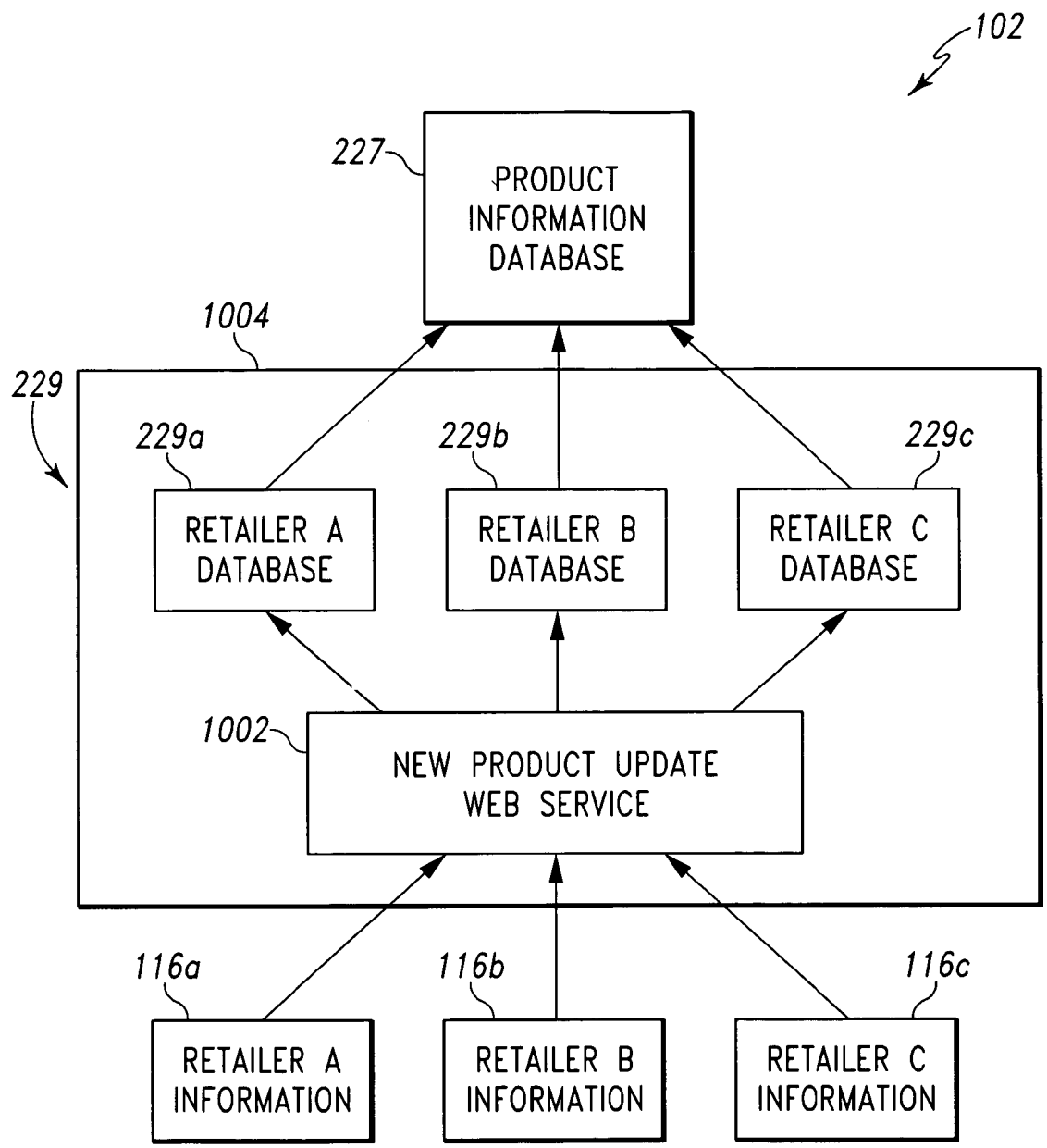
FIG. 10 is a first data flow diagram for the communication system of FIG. 1.
Figure 11:
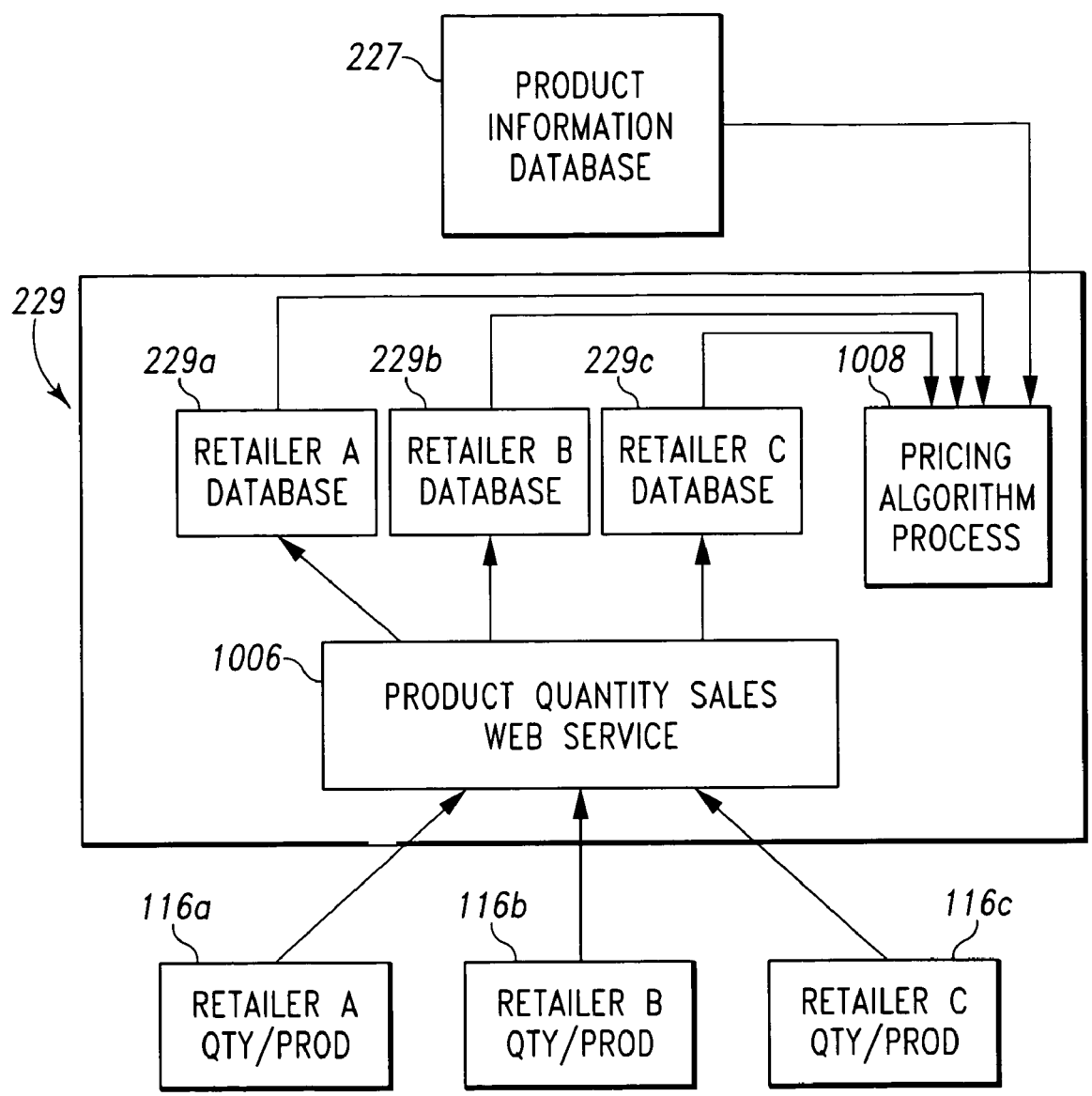
FIG. 11 is a second data flow diagram for the communication system of FIG. 1.
Figure 12:
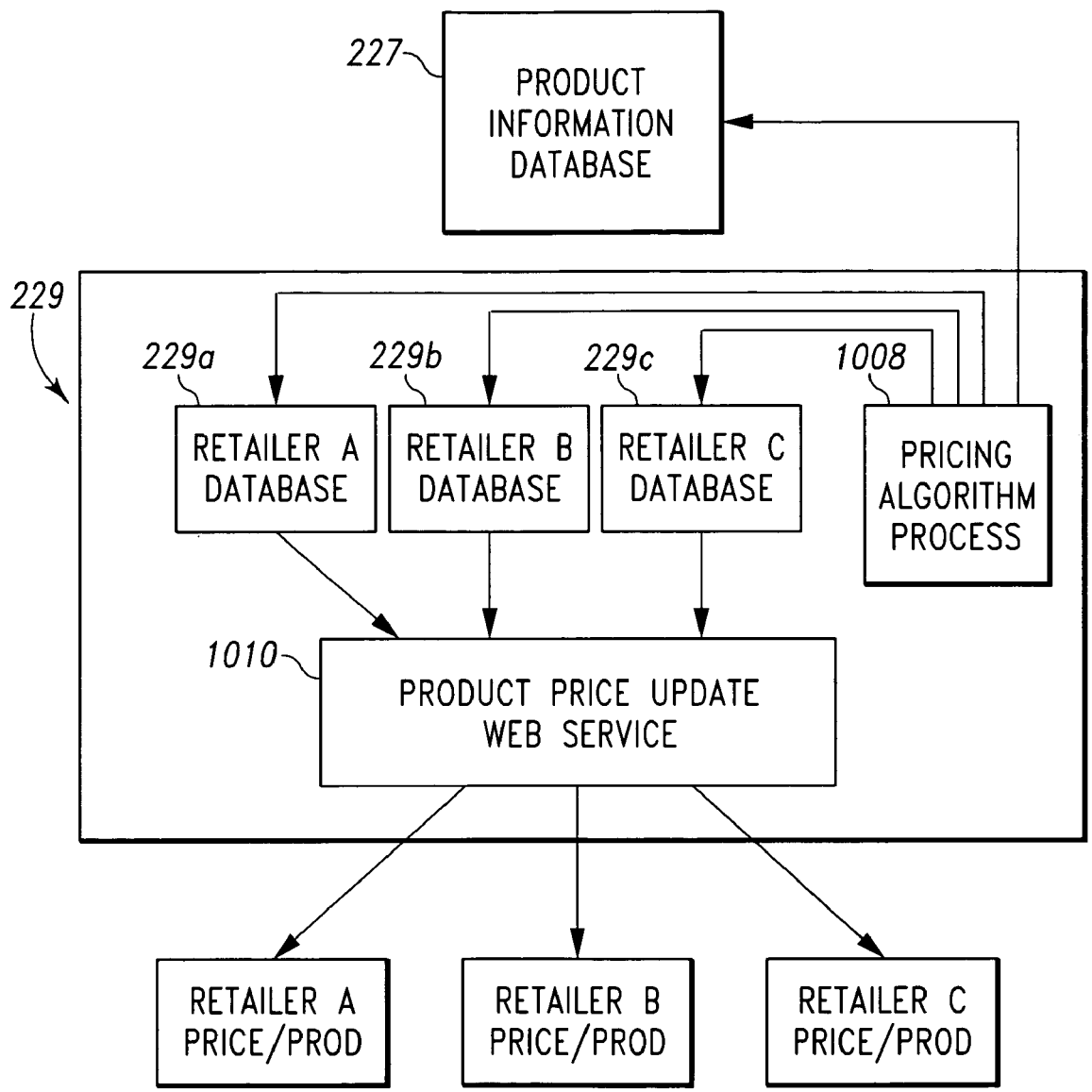
FIG. 12 is a third data flow diagram for the communication system of FIG. 1.

FIGS. 10–12 show an illustrative data flow diagram for the communication system 100. In FIG. 10, the merchant computers 116a–116c transmit information about new products. The information may include, for example, a minimum and maximum price, a product description, a universal reference locator for a website operated by one of the merchants that sell the product, and any other information that may be pertinent to the new product. This information is provided to the new product update web service 1002. The new product update web service 1002 may reformat the product information, and store the information in a respective merchant database 229.

For example, a merchant database 229a may be associated with the merchant computer 116a, a merchant database 229b may be associated with the merchant computer 116b, and a merchant database 229c may be associated with the merchant computer 116c. The merchant databases 229 may provide the information, including price, to the product information database 227, and assign an extended-meta language (XML) universal reference locator. The extended-meta language universal reference locator is a simply method by which to extract product information from the respective merchant database 229. The data flow illustrated in FIG. 10 provides a means by which information about new products may be entered into the dynamic pricing system 102 from the merchant computers 116, so that new products may be searched for by the user of the customer device 124, and so that prices for the new products may be calculated as described above in FIGS. 7–9.

Turning to FIG. 11, each of the merchant computers 116 may transmit a report of sale to the dynamic pricing system 102 each time a product is sold via one of the merchant computers 116, which includes data regarding at what price the product was sold. When a customer buys a good from a web site that is served from the merchant computer 116a, as opposed to buying a good directly from the dynamic pricing system 102, there is a sale pertinent to determining a profitable price for that that good. When such a sale occurs, the respective merchant computer 116 may transmit the report of sale to the dynamic pricing system 102 so that information regarding this sale may be used by the dynamic pricing system 102 in determining a price.

For example, in FIG. 7, at 704 the reports of sale may be received by the dynamic pricing system 102 from the merchant computers 116. For further examples, in FIGS. 8–9 at 804 and 908, respectively, the information regarding sales may be may be received by the dynamic pricing system 102 from one of the merchant computers 116. The reports of sale may alternatively contain information relating to a number of different sales, such as the number of sales for a product sold at a particular price over a given period of time. For example, twelve toasters were sold at a price of nineteen dollars each between one and three o'clock in the afternoon. Of course, the reports of sale may also include information regarding a number of different products to reduce network traffic.

This report of sale from the merchant computers 116 is sent to a product quantity web service 1006. The product quantity web service 1006 may reformat the sale related information, and store the information in a respective merchant database 229. A pricing algorithm process 1008 receives the sales notice information from the merchant databases 229, and receives product information from the product information database 227. The pricing algorithm process 1008 may implement one of the methods illustrated above in FIGS. 7–9 to determine a new price for the product for a given merchant. For products sold via only the merchant computers 116, data from only that source may be used by the pricing algorithm process 1008. Alternatively, where the product is sold directly from the dynamic pricing system 102 as well as from the merchant computers 116, data from each may be used by pricing algorithm process 1008. Alternatively, each merchant may chose to set a product sale price on their own, bypassing the pricing algorithm process 1008 altogether.

Turning to FIG. 12, the pricing algorithm process 1008 transmit new price data to the merchant computers 116 and/or the product information database 227 once a new price for a product has been calculated based on the report(s) of sale. The pricing algorithm process 1008 may store the new price data in the respective merchant database 229. For example, the pricing algorithm process 1008 may determine a new price for the product exclusively for the merchant computer 116a, based on data from the merchant computers 116a alone, or in combination with other data. This new pricing information is then stored in the merchant database 229a, and used when customers who use the graphical user interface 500 search for the product, such as when displaying a product listing 526 for the product.

Additionally, the new price data may be provided from the respective merchant database 229 to a product price update web service 1010. The product price update web service 1010 may read the data from the merchant database 229 periodically, or alternatively, may receive a price update notice from the merchant databases 229 when a particular price is updated. The product price update web service 1010 may reformat the new price data from the merchant databases 229 and transmit the new price data to the merchant computers 116. In this manner, the new price for a product available form a web site served by one of the merchant computers 116 is synchronized with the price for the product displayed by the graphical user interface application 500 for that merchant computer 116.

Figure 13:
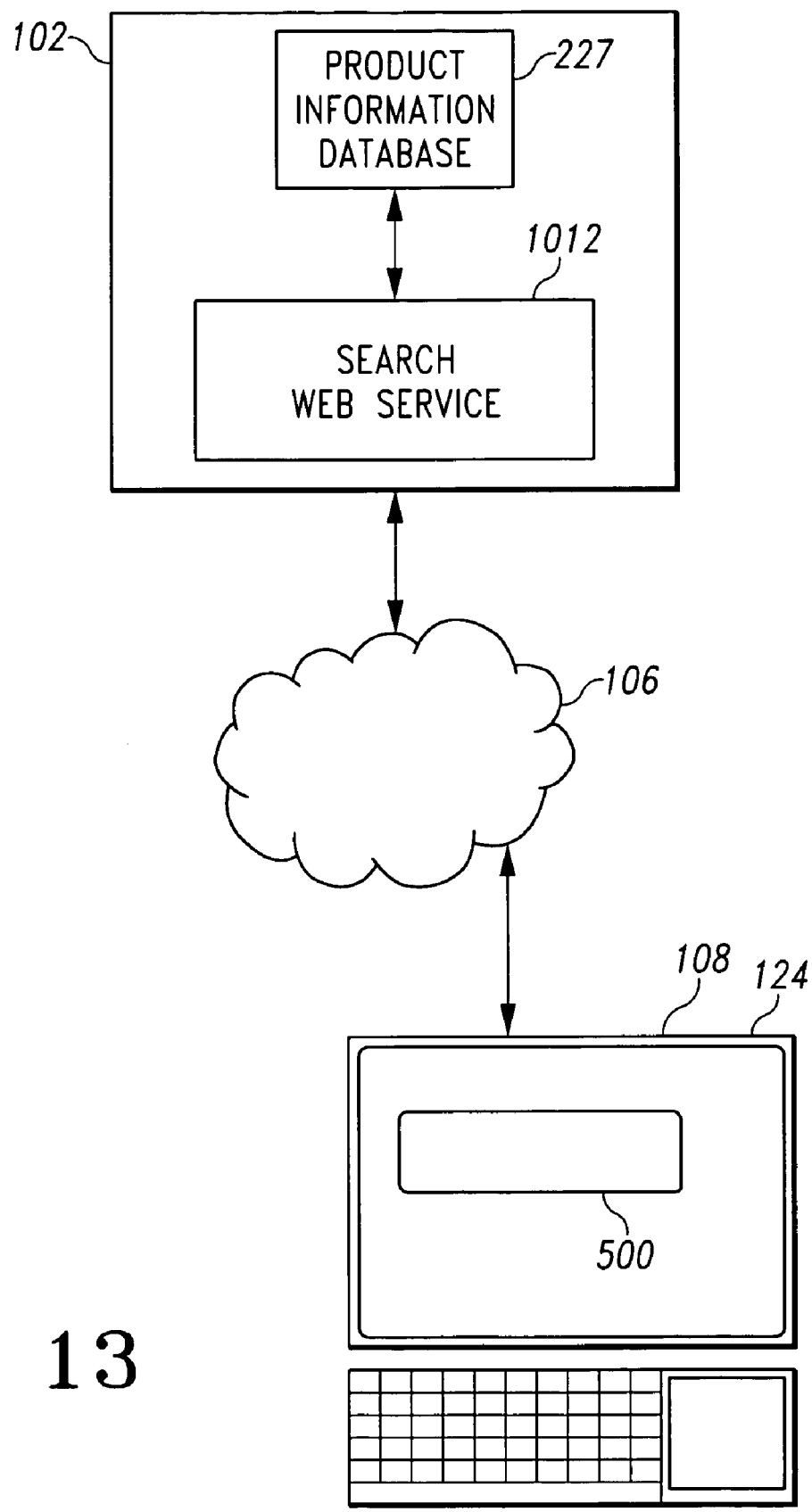
FIG. 13 is a first data flow diagram showing data flow between the graphical user interface of FIG. 5 and the dynamic pricing system of FIG. 1.
Figure 14:
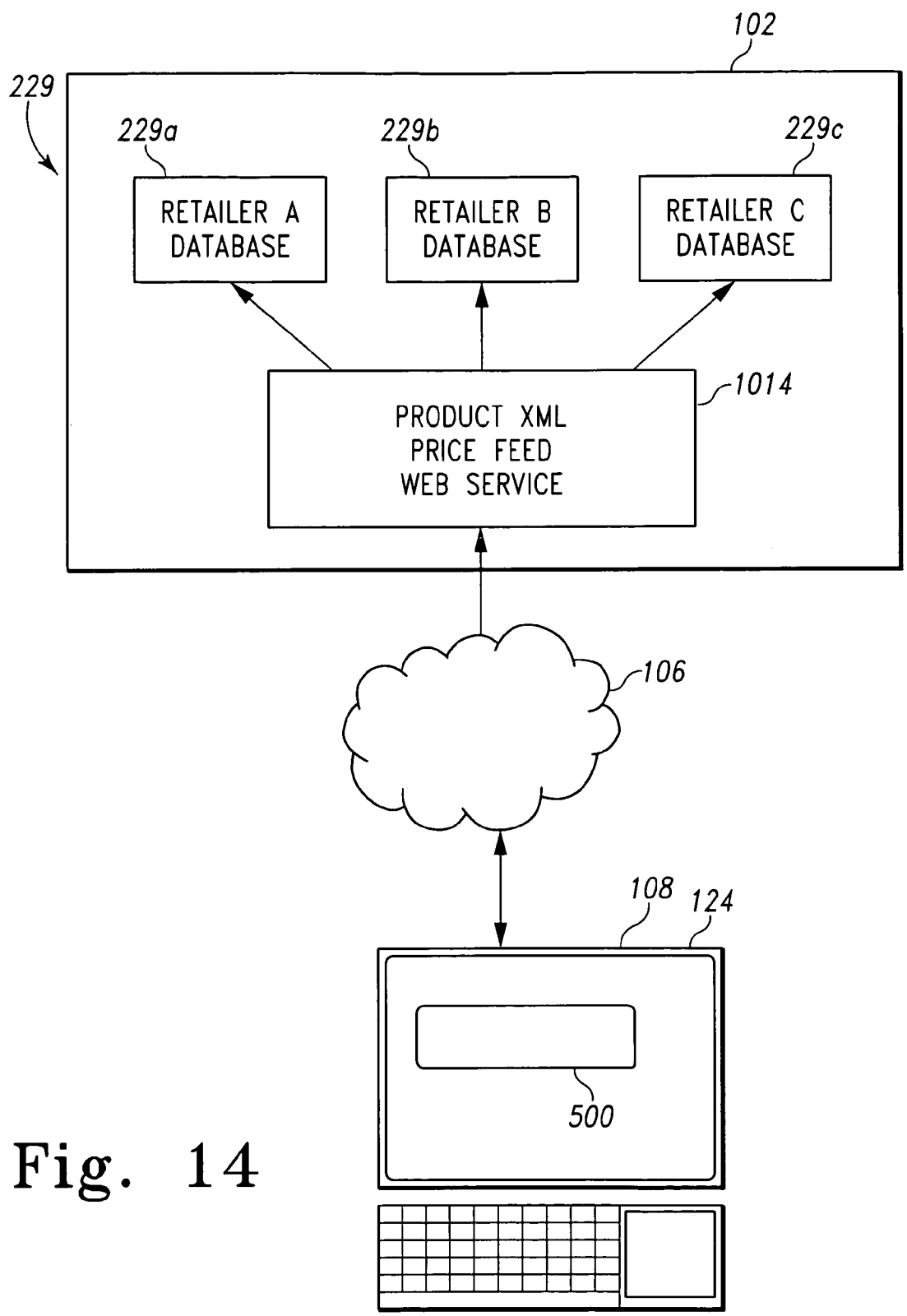
FIG. 14 second data flow diagram showing data flow between the graphical user interface of FIG. 5 and the dynamic pricing system of FIG. 1.

FIGS. 13–14 illustrate the interaction between the graphical user interface 500 and the dynamic pricing system 102 in more detail. In FIG. 13, the user of the graphical user interface 500 running on the customer devices 124 requests a search for a product using the new search tab 518, as shown in FIG. 5. The search request is communicated via the network 106 to a search web service 1012. The search web service 1012 reads the product information database 227 to find information regarding the product. The search request may be very specific, such as "Sony DVD RDR-GX7", or may be broad, such as "DVD". The search web service 1012 will generate extended-meta language universal reference locators for matching entries found in the product information database 227. These extended-meta language universal reference locators may include information for one or more of the merchant computers 116. The extended-meta language universal reference locators are then transmitted, via the network 106, from the search web service 1012 to the graphical user interface 500 running on the customer devices 124.

In FIG. 14, after receiving one or more extended-meta language universal reference locators sent by the search web service 1012, the graphical user interface 500 running on the customer devices 124 transmits a query that includes the extended-meta language universal reference locator(s), via the network 106, to a product XML price feed web service 1014. The product XML price feed web service 1014 queries the merchant databases 229 using the extended-meta language universal reference locator(s) to obtain pricing information for the product, which is then transmitted back through the network 106 to the graphical user interface 500 running on the customer devices 124. The graphical user interface 500 may request pricing information in this manner from time to time to update the prices displayed in the ticker window 520 (shown in FIG. 5).

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for dynamically adjusting a price, comprising:
    sending a first price of a product from a processor to a client computer comprising a graphical user interface;
    displaying the first price via the graphical user interface;
    receiving a report of sale for the product at the first price from a merchant computer comprising a network server configured to process orders for the product;
    determining with the processor, based at least on the report of sale, a first profit at the first price;
    determining with the processor that the first profit is less than a previous profit at a previous price;
    pricing the product at a second price with the processor;
    sending the second price from the processor to the merchant computer;
    sending the second price from the processor to the client computer; and
    displaying the second price in the graphical user interface.

2. The method of claim 1, wherein pricing the product at a second price comprises setting the second price to a lower price than the first price.

3. The method of claim 1, wherein pricing the product at a second price comprises setting the second price to a higher price than the first price.

4. The method of claim 1, wherein pricing the product at a second price comprises setting the second price to a price halfway between the first price and a best price at which a best profit was previously obtained.

5. The method of claim 1, further comprising:
    receiving a second report of sate for the product at the second price from the merchant computer; and pricing the product at a third price with the processor based at least on the second report of sale.

6. The method of claim 1, wherein displaying the first price via the graphical user interface comprises associating the first price with a link to the merchant computer and displaying product ordering information in response to an activation of the link.

7. The method of claim 6, wherein displaying product ordering information in response to an activation of the link includes displaying the product ordering information in a second graphical user interface.

8. The method of claim 1, wherein displaying the first plurality of prices via the graphical user interface comprises associating a link to a respective merchant computer with each price of the plurality of prices and displaying product ordering information from the respective merchant computer in response to an activation of the link of the plurality of links.

9. The method of claim 8, wherein displaying product ordering includes displaying the product ordering information in a second graphical user interface.

10. The apparatus of claim 9, wherein the processor formats the a plurality of prices, and communicates the a plurality of prices to the first interface.

11. The apparatus of claim 9, wherein the processor formats the second price, and communicates the second price to the third interface.

12. The apparatus of claim 9, further comprising a memory coupled to the processor, wherein the report of sale comprises a plurality of reports of sale, and the memory comprises software that causes the processor to determine the second price based on a quantity of reports of sale received by the second interface.

13. The apparatus of claim 9, further comprising a memory coupled to the processor, wherein the memory comprises a database that associates the plurality of prices to a plurality of addresses for merchant computers.

14. The apparatus of claim 9, further comprising a memory coupled to the processor, wherein the memory comprises a database that associates the plurality of prices to a plurality of addresses for merchant computers.

15. The apparatus of claim 14, wherein the first interface is further operable to send the plurality of addresses for merchant computers to the client computer.

16. A method for dynamically adjusting a plurality of prices, comprising:
    sending a plurality of prices for a product from a processor to a client computer comprising a graphical user interface;
    displaying the first plurality of prices via the graphical user interface;
    receiving a first report of sale for the product at a first price of the plurality of prices from a first merchant computer;
    determining a second price for the product with the processor based at least on the first report of sale;
    sending the second price from the processor to the first merchant computer;
    sending the second price from the processor to the client computer; and
    replacing the first price of the plurality of prices in the graphical user interface with the second price.

17. The method of claim 16, wherein determining a second price for the product comprises setting the second price to a lower price than the first price.

18. The method of claim 16, wherein determining a second price for the product comprises setting the second price to a higher price than the first price.

19. The method of claim 16, wherein determining a second price for the product comprises setting the second price to a price halfway between the first price and a best price at which a best profit was previously obtained.

20. A method for dynamically adjusting a plurality of prices, comprising:
    sending a plurality of prices for a product from a processor to a client computer comprising a graphical user interface;
    displaying the first plurality of prices via the graphical user interface;
    receiving a first report of sale for the product at a first price of the plurality of prices from a first merchant computer;
    receiving a second report of sale for the product at a second price of the plurality of prices from a second merchant computer;
    determining a third price for the product with the processor based at least on the first report of sale;
    determining a fourth price for the product with the processor based at least on the second report of sale,
    sending the third price from the processor to the first merchant computer;
    sending the third price from the processor to the client computer;
    sending the fourth price from the processor to the first merchant computer;
    sending the fourth price from the processor to the client computer;
    replacing the first price of the plurality of prices in the graphical user interface with the third price,
    replacing the second price of the plurality of prices in the graphical user interface with the fourth price.

21. The method of claim 20, wherein determining a third price for the product comprises setting the second price to a lower price than the first price.

22. The method of claim 20, wherein determining a third price for the product comprises setting the second price to a higher price than the first price.

23. The method of claim 20, wherein determining a third price for the product comprises setting the second price to a price halfway between the first price and a best price at which a best profit was previously obtained.

24. A method for dynamically adjusting a plurality of prices, comprising:
    sending a plurality of prices for a product from a processor to a client computer comprising a graphical user interface;
    displaying the first plurality of prices via the graphical user interface;
    receiving a first report of sale for the product at a first price of the plurality of prices from a first merchant computer;
    receiving a second report of sale for the product at a second price of the plurality of prices from a second merchant computer;
    determining a third price for the product with the processor based at least on the first report of sale and on the second report of sale;
    sending the third price from the processor to the first merchant computer;
    sending the third price from the processor to the client computer; and replacing the first price of the plurality of prices in the graphical user interface with the third price.

25. The method of claim 24, further comprising:
determining a fourth price for the product with the processor based at least on the first report of sale and on the second report of sale;
sending the fourth price from the processor to the second merchant computer;
replacing the second price of the plurality of prices in the graphical user interface with the fourth price.

26. The method of claim 24, wherein determining a third price for the product comprises setting the third price to a lower price than the first price.

27. The method of claim 24, wherein determining a third price for the product comprises setting the third price to a higher price than the first price.

28. The method of claim 24, wherein determining a third price for the product comprises setting the third price to a price halfway between the first price and a best price at which a best profit was previously obtained.

29. An apparatus, comprising:
a first interface, the first interface operable to send a plurality of prices for a product to a client computer;
a second interface, the second interface operable to receive a report of sale for the product at a fast price of the plurality of prices from a merchant computer;
a processor coupled to the first interface and the second interface, the processor operable to determine, based on the report of sale, a difference between a first profit at the first price of the plurality of prices and a previous profit at a previous price, and to price the product at a second price; and
a third interface coupled to the processor, the third interface operable to send the second price to the client computer.

30. The apparatus of claim 29, wherein the first interface, the second interface, and the third interface are each a network interface.

31. The apparatus of claim 30, wherein the first interface, the second interface, and the third interface are a single interface.

32. The apparatus of claim 29, wherein the first interface, the second interface, and the third interface are a single interface.

* * * * *